(12) United States Patent
Tanaka et al.

(10) Patent No.: US 11,630,409 B2
(45) Date of Patent: Apr. 18, 2023

(54) IMAGE PROCESSING METHOD, IMAGE PROCESSING APPARATUS

(71) Applicant: KYOCERA Document Solutions Inc., Osaka (JP)

(72) Inventors: Kazunori Tanaka, Osaka (JP); Kanako Morimoto, Osaka (JP); Takuya Miyamoto, Osaka (JP); Koji Sato, Osaka (JP); Rui Hamabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/558,338

(22) Filed: Dec. 21, 2021

(65) Prior Publication Data
US 2022/0206424 A1   Jun. 30, 2022

(30) Foreign Application Priority Data

Dec. 24, 2020   (JP) .............................. JP2020-214852

(51) Int. Cl.
*G03G 15/00* (2006.01)
(52) U.S. Cl.
CPC ..... *G03G 15/5062* (2013.01); *G03G 15/5054* (2013.01); *G03G 15/55* (2013.01); *G03G 2215/00042* (2013.01)
(58) Field of Classification Search
CPC ........... G03G 15/5062; G03G 15/5054; G03G 2215/00042
See application file for complete search history.

(56) References Cited

U.S. PATENT DOCUMENTS 6,553,191 B1 *  4/2003  Nakane .............. G03G 15/5041
                                                        399/72
2020/0051231 A1 *  2/2020  Tsukamoto ........... G06F 3/1259

FOREIGN PATENT DOCUMENTS

JP        2017083544 A       5/2017

* cited by examiner

*Primary Examiner* — Clayton E. LaBalle
*Assistant Examiner* — Michael A Harrison
(74) *Attorney, Agent, or Firm* — Alleman Hall Creasman & Tuttle LLP

(57) ABSTRACT

A processor selects a target sheet from a plurality of predetermined sheet candidates in accordance with selection information that is input via an input device. Furthermore, the processor derives feature information regarding a noise point from a target image that is obtained through an image reading process performed on an output sheet output from an image forming device, the noise point being a dot-like noise image included in the target image. Furthermore, the processor determines whether or not the noise point is a dot-like sheet noise by applying the feature information to a determination algorithm that corresponds to the target sheet, the sheet noise being included in a sheet of the output sheet itself, the determination algorithm being one of a plurality of determination algorithms that respectively correspond to the plurality of sheet candidates.

11 Claims, 8 Drawing Sheets

IMAGE PROCESSING METHOD, IMAGE PROCESSING APPARATUS

INCORPORATION BY REFERENCE

This application is based upon and claims the benefit of priority from the corresponding Japanese Patent Application No. 2020-214852 filed on Dec. 24, 2020, the entire contents of which are incorporated herein by reference.

BACKGROUND

The present disclosure relates to an image processing method and an image processing apparatus for determining whether or not a noise point in an image is a sheet noise.

An image forming apparatus such as a printer or a multifunction peripheral executes a print process to form an image on a sheet. In the print process, an image defect such as a vertical stripe, a horizontal stripe, a noise point, or density variation may be generated on the image formed on an output sheet.

For example, in a case where the image forming apparatus executes the print process by an electrophotographic method, the image defect may be caused by any of various parts such as a photoconductor, a charging portion, a developing portion, and a transfer portion. In addition, it requires skill to determine the cause of the image defect.

In addition, there is known an image processing apparatus that preliminarily stores, as table data, correspondence between: phenomena that cause the vertical stripe as an example of the image defect; and feature information such as the color of the vertical stripe, density, and the number of screen lines, wherein a phenomenon that has caused the vertical stripe is identified based on information of the color of an image of the vertical stripe, density, or the number of screen lines in a test image and the table data.

SUMMARY

An image processing method according to an aspect of the present disclosure includes a processor selecting a target sheet from a plurality of predetermined sheet candidates in accordance with selection information that is input via an input device. Furthermore, the image processing method includes the processor deriving feature information regarding a noise point from a target image that is obtained through an image reading process performed on an output sheet output from an image forming device, the noise point being a dot-like noise image included in the target image. Furthermore, the image processing method includes the processor executing a sheet noise determination process to determine whether or not the noise point is a dot-like sheet noise by applying the feature information to a determination algorithm that corresponds to the target sheet, the sheet noise being included in a sheet of the output sheet itself, the determination algorithm being one of a plurality of determination algorithms that respectively correspond to the plurality of sheet candidates.

An image processing apparatus according to another aspect of the present disclosure includes the processor that executes processes of the image processing method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8A shows a case where the symptom of the noise point is mild. FIG. 8B shows a case where the symptom of the noise point is middle. FIG. 8C shows a case where the symptom of the noise point is serious.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

Figure 1:
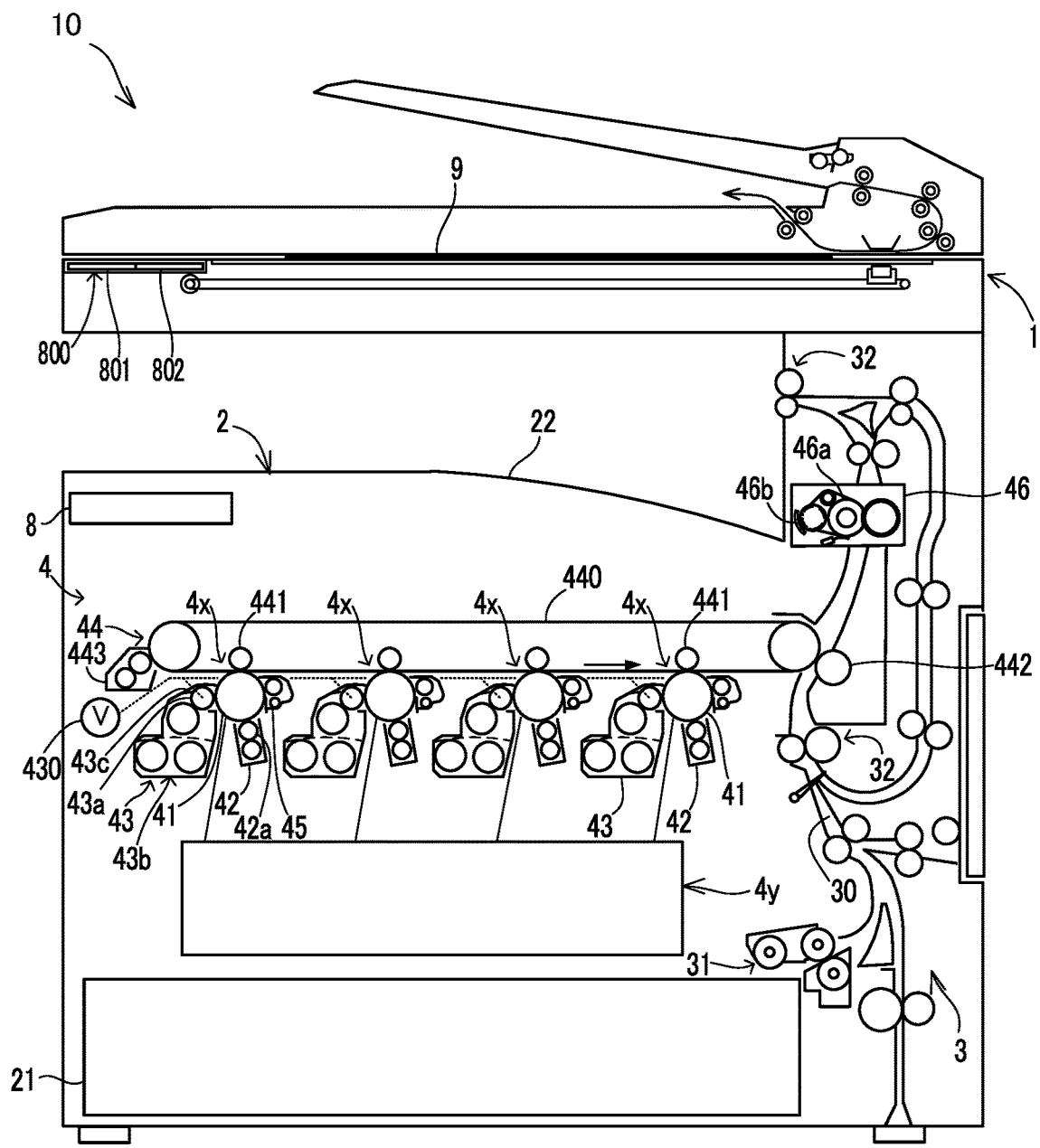
FIG. 1 is a configuration diagram of an image processing apparatus according to an embodiment.

As shown in FIG. 1, an image processing apparatus 10 according to an embodiment includes an image forming device 2 that executes a print process. In the print process, an image is formed on a sheet. The sheet is an image formation medium such as a sheet of paper or a sheet-like resin material.

Furthermore, the image processing apparatus 10 includes an image reading device 1 that executes a reading process to read an image from a document sheet. For example, the image processing apparatus 10 is a copier, a facsimile apparatus, or a multifunction peripheral.

The image processing apparatus 10 includes a data processing portion 8 and a human interface device 800 in addition to the image forming device 2 and the image reading device 1. The human interface device 800 includes an operation portion 801 and a display portion 802.

The image targeted to be processed in the print process is, for example, an image read from the document sheet by the image reading device 1 or an image represented by print data received from a host apparatus (not shown). The host apparatus is an information processing apparatus such as a personal computer or a mobile information terminal.

Figure 6:
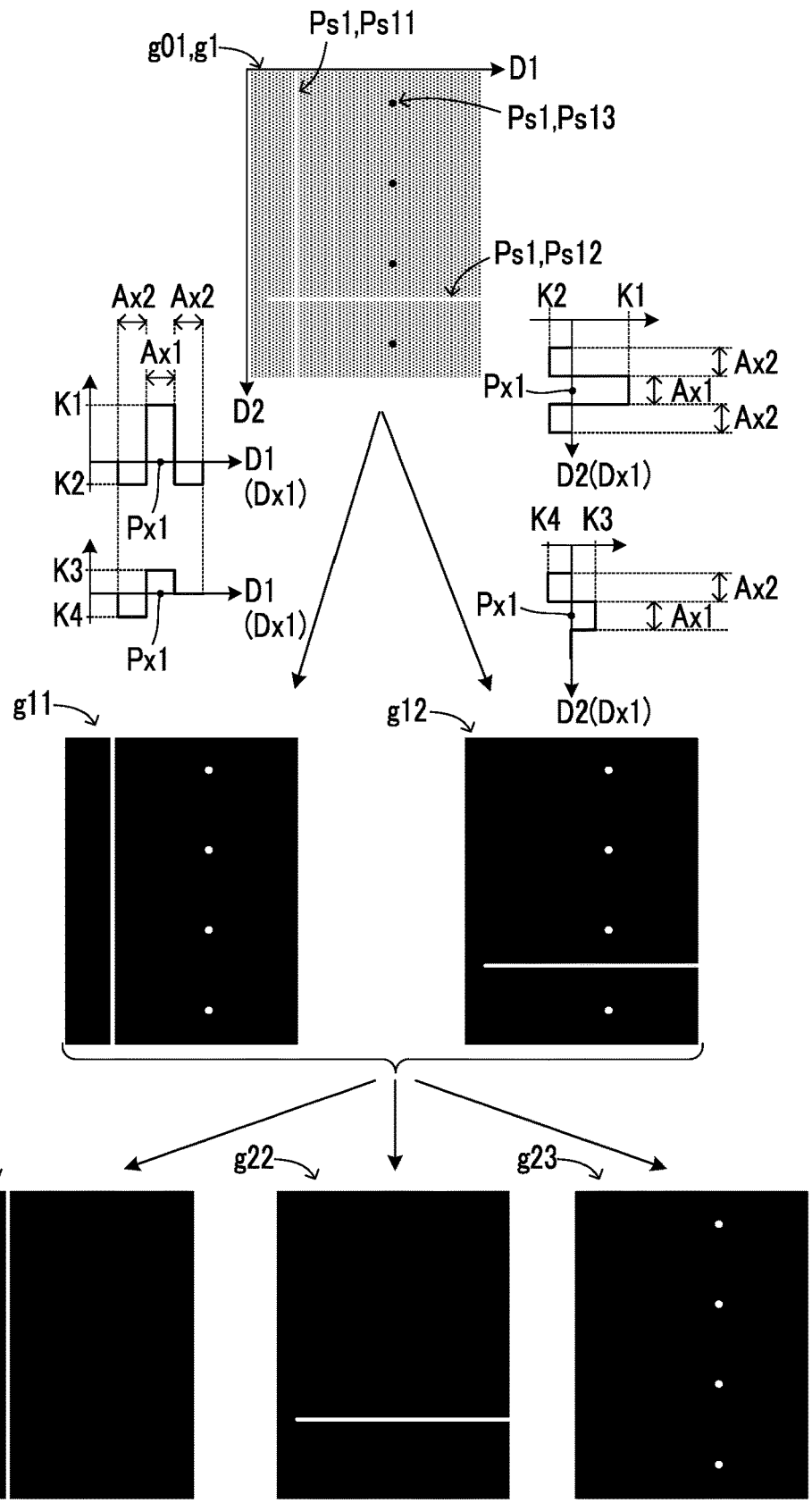
FIG. 6 is a diagram showing an example of a test image including specific parts and examples of pre-process images and feature images generated based on the test image.

Furthermore, in the print process, the image forming device 2 may form a predetermined original test image g01 on a sheet (see FIG. 6). The original test image g01 is an original of a test image g1 that is used to determine whether or not an image defect has been generated by the image forming device 2 and to determine the cause of the image defect (see FIG. 6). The test image g1 is described below.

A copy process includes: the reading process performed by the image reading device 1; and the print process performed by the image forming device 2 based on an image obtained in the reading process.

As shown in FIG. 1, the image forming device 2 includes a sheet conveying mechanism 3 and a print portion 4. The sheet conveying mechanism 3 includes a sheet feed-out mechanism 31 and a plurality of pairs of sheet conveying rollers 32.

The sheet feed-out mechanism 31 feeds out a sheet from a sheet storage portion 21 to a sheet conveyance path 30. The plurality of pairs of sheet conveying rollers 32 convey the sheet along the sheet conveyance path 30, and discharge the sheet with an image formed thereon to a discharge tray 22.

The print portion 4 executes the print process on the sheet conveyed by the sheet conveying mechanism 3. In the present embodiment, the print portion 4 executes the print process by an electrophotographic method.

The print portion 4 includes an image creating portion 4x, a bias output circuit 430, a laser scanning unit 4y, a transfer device 44, and a fixing device 46. The image creating portion 4x includes a drum-like photoconductor 41, a charging device 42, a developing device 43, and a drum cleaning device 45.

The photoconductor 41 rotates, and the charging device 42 electrically charges the surface of the photoconductor 41 uniformly. The charging device 42 includes a charging roller 42a that rotates while in contact with the surface of the photoconductor 41. The charging device 42 electrically charges the surface of the photoconductor 41 by outputting a charging voltage to the photoconductor 41 through the charging roller 42a.

The laser scanning unit 4y writes an electrostatic latent image on the charged surface of the photoconductor 41 by scanning a laser light.

The developing device 43 develops the electrostatic latent image as a toner image. The photoconductor 41 is an example of an image carrier that carries the toner image. The developing device 43 includes a developing roller 43a, a developer tank 43b, and a regulation blade 43c. The developer tank 43b stores toner.

The developing roller 43a supplies the toner to the surface of the photoconductor 41 by rotating while carrying the toner in the developer tank 43b. The bias output circuit 430 applies a developing bias to each of the developing rollers 43a. The reference potential of the developing bias is the potential of the photoconductor 41. In the present embodiment, the bias output circuit 430 is configured to correct the developing bias.

The regulation blade is configured to regulate the thickness of a layer of the toner carried by the developing roller 43a. It is noted that four developing devices 43 corresponding to four types of developing colors are each an example of a developing portion.

The transfer device 44 transfers the toner image from the surface of the photoconductor 41 to the sheet. It is noted that the toner is an example of granular developer.

The fixing device 46 fixes the toner image on the sheet to the sheet by heating. The fixing device 46 includes a fixing rotating body 46a and a fixing heater 46b, wherein the fixing rotating body 46a rotates while in contact with the sheet and the fixing heater 46b heats the fixing rotating body 46a.

The image forming device 2 shown in FIG. 1 is a tandem-type color printer that is configured to execute the print process to process a color image. As a result, the print portion 4 includes four image creating portions 4x corresponding to four different colors of toner. The four image creating portions 4x have different developing colors.

In addition, in the tandem-type image forming device 2, the transfer device 44 includes four primary transfer rollers 441, an intermediate transfer belt 440, a secondary transfer roller 442, and a belt cleaning device 443, wherein the four primary transfer rollers 441 correspond to four photoconductors 41.

The four image creating portions 4x respectively form cyan, magenta, yellow, and black toner images on the surfaces of the photoconductors 41. Each of the primary transfer rollers 441 is a part of a corresponding one of the image creating portions 4x.

In each of the image creating portions 4x, the primary transfer roller 441, while rotating, biases the intermediate transfer belt 440 toward the surface of the photoconductor 41. The primary transfer roller 441 transfers the toner image from the photoconductor 41 to the intermediate transfer belt 440. This allows a color image composed of toner images of four colors to be formed on the intermediate transfer belt 440.

In each of the image creating portions 4x, the drum cleaning device 45 removes and collects, from the photoconductor 41, toner that has remained on the photoconductor 41 without being transferred to the intermediate transfer belt 440.

The secondary transfer roller 442 transfers the toner images of the four colors from the intermediate transfer belt 440 to a sheet. It is noted that in the image processing apparatus 10, the intermediate transfer belt 440 is an example of a transfer body that transfers the toner images to the sheet.

The belt cleaning device 443 removes and collects, from the intermediate transfer belt 440, toner that has remained on the intermediate transfer belt 440 without being transferred to the sheet.

The data processing portion 8 executes various types of data processing concerning the print process and the reading process, and further controls various types of electric devices.

The operation portion 801 is an example of an input device configured to input information in accordance with a user operation. For example, the operation portion 801 includes either or both of a pushbutton and a touch panel. The display portion 802 includes a display panel that displays information for the users.

Figure 2:
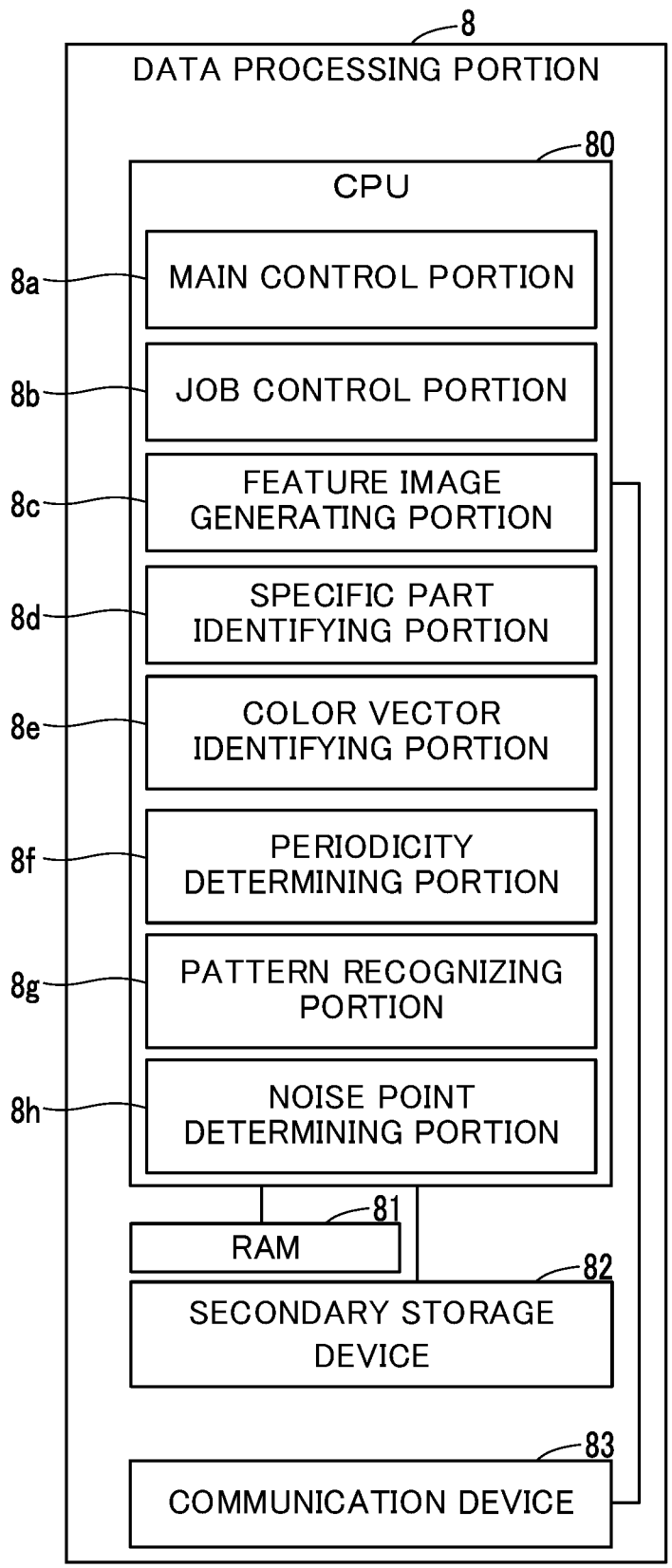
FIG. 2 is a block diagram showing a configuration of a data processing portion in the image processing apparatus according to the embodiment.

As shown in FIG. 2, the data processing portion 8 includes a CPU (Central Processing Unit) 80, a RAM (Random Access Memory) 81, a secondary storage device 82, and a communication device 83.

The CPU 80 is configured to process data received by the communication device 83, and perform controls of various types of image processing and the image forming device 2. The received data may include print data. The CPU 80 is an example of a processor that executes data processing including the image processing. It is noted that the CPU 80 may be realized by another type of processor such as a DSP (Digital Signal Processor).

The communication device 83 is a communication interface device that performs communication with other apparatuses such as the host apparatus via a network such as a LAN (Local Area Network). The CPU 80 performs data transmissions and receptions with the external apparatuses all via the communication device 83.

The secondary storage device 82 is a computer-readable nonvolatile storage device. The secondary storage device 82 stores computer programs executed by the CPU 80 and various types of data referenced by the CPU 80. For example, either or both of a flash memory and a hard disk drive are adopted as the secondary storage device 82.

The RAM 81 is a computer-readable volatile storage device. The RAM 81 primarily stores the computer programs executed by the CPU 80 and data that is output and referenced by the CPU 80 during execution of the programs.

The CPU 80 includes a plurality of processing modules that are realized when the computer programs are executed. The plurality of processing modules include a main control portion 8a and a job control portion 8b. It is noted that a part or all of the plurality of processing modules may be realized by another type of processor such as the DSP that is independent of the CPU 80.

The main control portion 8a executes a process to select a job in response to an operation performed on the operation portion 801, a process to display information on the display portion 802, and a process to set various types of data. Furthermore, the main control portion 8a executes a process to determine the content of data received by the communication device 83.

The job control portion 8b controls the image reading device 1 and the image forming device 2. For example, in a case where the data received by the communication device 83 includes print data, the job control portion 8b causes the image forming device 2 to execute the print process.

In addition, when the main control portion 8a has detected a copy request operation performed on the operation portion 801, the job control portion 8b causes the image reading device 1 to execute the reading process and causes the image forming device 2 to execute the print process based on an image obtained in the reading process.

In the print process, a noise image such as a vertical stripe Ps11, a horizontal stripe Ps12, or a noise point Ps13 may be generated on an image formed on an output sheet (see FIG. 6). The vertical stripe Ps11 is a line-like noise image extending in the sub scanning direction D2. The horizontal stripe Ps12 is a line-like noise image extending in the main scanning direction D1. The noise point Ps13 is a dot-like noise image.

As described above, the image forming device 2 executes the print process by the electrophotographic method. In this case, the noise image may be caused by any of various parts such as the photoconductor 41, the charging device 42, the developing device 43, and the transfer device 44. In addition, it requires skill to determine the cause of the noise image.

In the present embodiment, the image forming device 2 executes a test print process to form a predetermined original test image g01 on a sheet (see FIG. 6).

For example, when the main control portion 8a has detected a test output operation performed on the operation portion 801, the job control portion 8b causes the image forming device 2 to execute the test print process. In the following description, the sheet on which the original test image g01 has been formed is referred to as a test output sheet 9 (see FIG. 1).

Furthermore, when the test print process has been executed, the main control portion 8a displays a predetermined guide message on the display portion 802. The guide message urges setting the test output sheet 9 on the image reading device 1 and then performing a reading start operation on the operation portion 801.

When the main control portion 8a has detected the reading start operation performed on the operation portion 801 after the guide message was displayed on the display portion 802, the job control portion 8b causes the image reading device 1 to execute the reading process. This allows the original test image g01 to be read by the image reading device 1 from the test output sheet 9 output from the image forming device 2, and a read image corresponding to the original test image g01 is obtained.

As described below, when a noise image such as the noise point Ps13 is included in the test image g1, the CPU 80 determines the cause of the noise image. The test image g1 is the read image or a compressed image of the read image. The CPU 80 is an example of a processor that executes a process of an image processing method to determine the cause of the noise image.

It is noted that the original test image g01 may be read from the test output sheet 9 by a device such as a digital camera. It is noted that a process in which the image reading device 1 or the digital camera reads the original test image g01 from the test output sheet 9 is an example of an image reading process performed on the test output sheet 9.

The test output sheet 9 is an example of an output sheet output from the image forming device 2. The test image g1 is an example of a target image that is obtained through the image reading process performed on the test output sheet 9.

Meanwhile, the test image g1 that is an output image of the image forming device 2, may include a sheet noise. The sheet noise is a dot-like noise image included in a sheet of the test output sheet 9 itself. If a wrong determination is made with regard to which of the sheet noise and the image defect is the noise point Ps13 in the test image g1, a wrong measure is taken.

The CPU 80 executes an image defect determination process that is described below (see FIG. 3 to FIG. 5). This allows the CPU 80 to determine whether or not the noise point Ps13 in the test image g1 is the sheet noise. Furthermore, the CPU 80 determines the state of the image defect based on the test image g1 from which the sheet noise has been removed.

In the following description, images such as the test image g1 targeted to be processed by the CPU 80 are digital image data. The digital image data constitutes, for each of three primary colors, map data that includes a plurality of pixel values corresponding to a two-dimensional coordinate area in a main scanning direction D1 and a sub scanning direction D2 crossing the main scanning direction D1. The three primary colors are, for example, red, green, and blue. It is noted that the sub scanning direction D2 is perpendicular to the main scanning direction D1. It is noted that the main scanning direction D1 is a horizontal direction in the test image g1, and the sub scanning direction D2 is a vertical direction in the test image g1.

In the present embodiment, the test image g1 is a mixed-color halftone image that is a combination of a plurality of uniform single-color halftone images that correspond to the plurality of developing colors used in the image forming device 2. The plurality of single-color halftone images are each formed uniformly with a predetermined halftone reference density.

For example, the original test image g01 and the test image g1 are each a mixed-color halftone image that is a combination of a plurality of uniform single-color halftone images that correspond to the plurality of developing colors used in the image forming device 2. The plurality of single-color halftone images are each formed uniformly with a predetermined halftone reference density.

In the present embodiment, the original test image g01 and the test image g1 are each a mixed-color halftone image that is generated by combining four uniform single-color halftone images that correspond to all developing colors used in the image forming device 2. In the test print process, one test output sheet 9 including one original test image g01 is output. Accordingly, one test image g1 corresponding to the original test image g01 is a particular target for identifying the image defect. The test image g1 in the present embodiment is an example of a mixed-color test image.

In addition, the plurality of processing modules of the CPU 80 further include, for the execution of the image defect determination process, a feature image generating portion 8c, a specific part identifying portion 8d, a color vector identifying portion 8e, a periodicity determining portion 8f, a pattern recognizing portion 8g, and a noise point determining portion 8h (see FIG. 2).

[Image Defect Determination Process]

Figure 3:
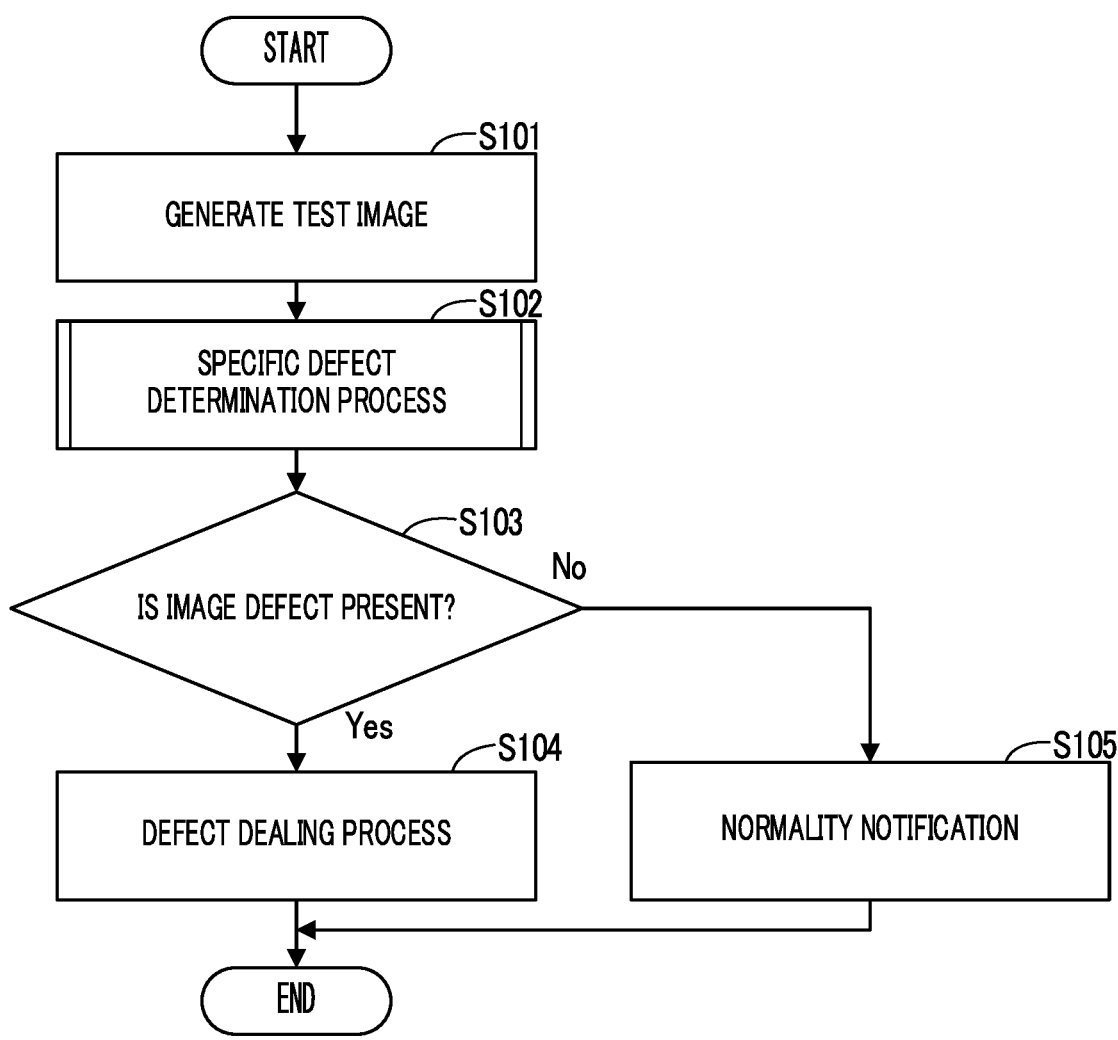
FIG. 3 is a flowchart showing an example of a procedure of an image defect determination process in the image processing apparatus according to the embodiment.

The following describes an example of a procedure of the image defect determination process with reference to the flowchart shown in FIG. 3. In the following description, S101, S102, . . . are identification signs representing a plurality of steps of the image defect determination process.

When the reading process is executed in response to the reading start operation performed on the operation portion 801 after the guide message is displayed on the display portion 802, the main control portion 8a causes the feature image generating portion 8c to execute step S101 of the image defect determination process.

<Step S101>

In step S101, the feature image generating portion 8c generates the test image g1 from the read image that was obtained in the image reading process performed on the test output sheet 9.

For example, the feature image generating portion 8c extracts, as the test image g1, an original image part from the read image, wherein the original image part is a part of the read image excluding a margin area at the outer edge.

Alternatively, the feature image generating portion 8c generates the test image g1 by performing a compression process to compress the original image part of the read image excluding the margin area at the outer edge and a character part to a predetermined reference resolution. When the resolution of the read image is higher than the reference resolution, the feature image generating portion 8c compresses the read image. After generating the test image g1, the main control portion 8a moves the process to step S102.

<Step S102>

In step S102, the feature image generating portion 8c starts a specific defect determination process that is described below. The specific defect determination process is performed to determine whether or not an image defect such as the vertical stripe Ps11, the horizontal stripe Ps12, or the noise point Ps13 is present in the test image g1, and determine the cause of the image defect (see FIG. 6).

Furthermore, when the specific defect determination process is completed, the main control portion 8a moves the process to step S103.

<Step S103>

In step S103, the main control portion 8a determines whether or not an image defect has occurred based on the process of step S102. Upon determining that an image defect has occurred, the main control portion 8a moves the process to step S104. Otherwise, the main control portion 8a moves the process to step S105.

<Step S104>

In step S104, the main control portion 8a executes a defect dealing process that had been preliminarily associated with the type and cause of the image defect that was determined to have occurred based on the process of step S102.

For example, the defect dealing process includes either or both of a first dealing process and a second dealing process that are described below. The first dealing process is performed to display, on the display portion 802, a determination result of the cause of the image defect and a message that indicates a measure to be taken in correspondence with the cause of the image defect.

When the cause of the image defect includes the cause of the noise point Ps13, the first dealing process is an example of a process to notify the determination result of the noise point Ps13 via a notification device. The display portion 802 is an example of the notification device. The message that indicates a measure to be taken is, for example, a message that urges replacing a part corresponding to the cause of the image defect.

The second dealing process is performed to correct an image creation parameter so as to eliminate or alleviate the image defect. The image creation parameter is related to the control of the image creating portion 4x.

After executing the defect dealing process, the main control portion 8a ends the image defect determination process.

<Step S105>

On the other hand, in step S105, the main control portion 8a performs a normality notification to notify that no image defect was identified, and ends the image defect determination process.

[Specific Defect Determination Process]

Figure 4:
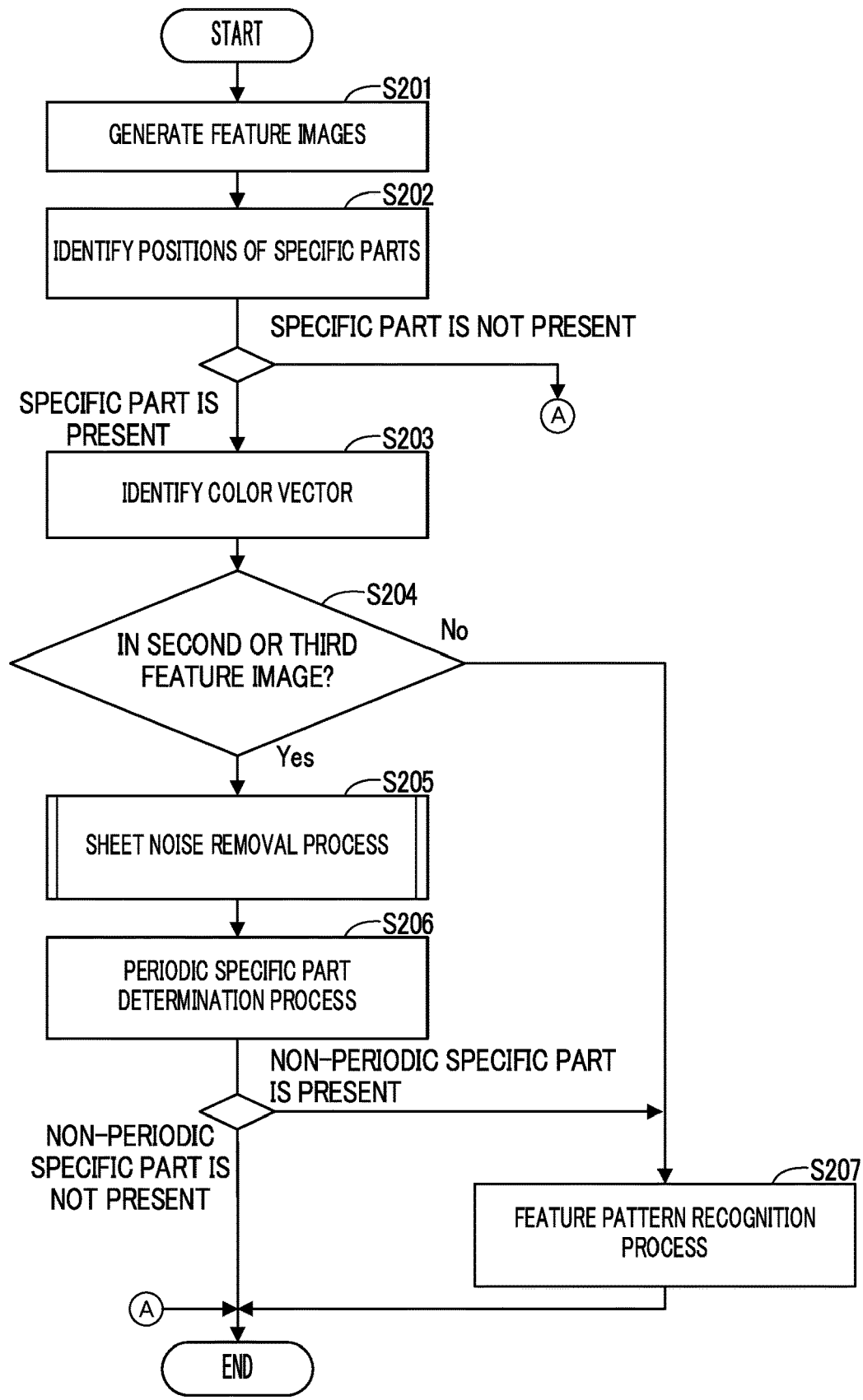
FIG. 4 is a flowchart showing an example of a procedure of a specific defect determination process in the image processing apparatus according to the embodiment.

Next, the following describes an example of a procedure of the specific defect determination process of step S102 with reference to the flowchart shown in FIG. 4. In the following description, S201, S202, . . . are identification signs representing a plurality of steps of the specific defect determination process. The specific defect determination process starts from step S201.

<Step S201>

First, in step S201, the feature image generating portion 8c generates a plurality of feature images g21, g22, and g23 by executing a predetermined feature extracting process on the test image g1. The plurality of feature images g21, g22, and g23 are images of specific parts Ps1 of predetermined particular types extracted from the test image g1.

In the present embodiment, the plurality of feature images g21, g22, and g23 include a first feature image g21, a second feature image g22, and a third feature image g23 (see FIG. 6).

The first feature image g21 is an image of the vertical stripe Ps11 extracted from the test image g1. The second feature image g22 is an image of the horizontal stripe Ps12 extracted from the test image g1. The third feature image g23 is an image of the noise point Ps13 extracted from the test image g1.

Figure 7:
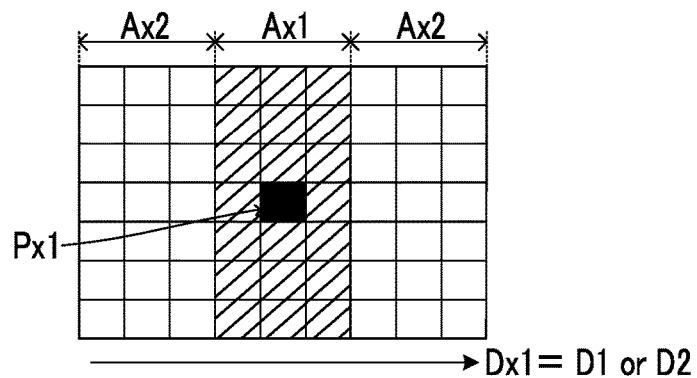
FIG. 7 is a diagram showing an example of a focused area and adjacent areas that are sequentially selected from the test image in a main filter process executed by the image processing apparatus according to the embodiment.

In the present embodiment, the feature extracting process includes a first pre-process, a second pre-process, and a specific part extracting process. In the following description, each of pixels that are sequentially selected from the test image g1 is referred to as a focused pixel Px1 (see FIG. 6, FIG. 7).

The feature image generating portion 8c generates a first pre-process image g11 by executing the first pre-process on the test image g1 using the main scanning direction D1 as a processing direction Dx1 (see FIG. 6).

Furthermore, the feature image generating portion 8c generates a second pre-process image g12 by executing the second pre-process on the test image g1 using the sub scanning direction D2 as the processing direction Dx1 (see FIG. 6).

Furthermore, the feature image generating portion 8c generates the three feature images g21, g22, and g23 by executing the specific part extracting process on the first pre-process image g11 and the second pre-process image g12.

The first pre-process includes a main filter process in which the processing direction Dx1 is the main scanning direction D1. In the main filter process, the pixel value of each of the focused pixels Px1 sequentially selected from the test image g1 is converted to a conversion value that is obtained by performing a process to emphasize the difference between a pixel value of a focused area Ax1 and a pixel value of two adjacent areas Ax2 that are adjacent to the focused area Ax1 (see FIG. 6, FIG. 7).

The focused area Ax1 includes the focused pixel Px1. The two adjacent areas Ax2 are adjacent to the focused area Ax1 from opposite sides in the processing direction Dx1 that is preliminarily set for the focused area Ax1. Each of the focused area Ax1 and the adjacent areas Ax2 includes one or more pixels.

The size of the focused area Ax1 and the adjacent areas Ax2 is set based on the width of the vertical stripe Ps11 or the horizontal stripe Ps12 to be extracted or the size of the noise point Ps13 to be extracted.

Each of the focused area Ax1 and the adjacent areas Ax2 occupies the same range in a direction crossing the processing direction Dx1. In the example shown in FIG. 7, the focused area Ax1 has 21 pixels of three columns and seven rows centered around the focused pixel Px1. Each of the adjacent areas Ax2 has 21 pixels of three columns and seven rows, too. In each of the focused area Ax1 and the adjacent areas Ax2, the number of rows is the number of lines along the processing direction Dx1, and the number of columns is the number of lines along a direction crossing the processing direction Dx1. The size of each of the focused area Ax1 and the adjacent areas Ax2 is preliminarily set.

In the main filter process, pixel values of pixels in the focused area Ax1 are converted to first correction values by using a predetermined first correction coefficient K1, and pixel values of pixels in the adjacent areas Ax2 are converted to second correction values by using a predetermined second correction coefficient K2.

For example, the first correction coefficient K1 is multiplied with each pixel value of the focused area Ax1 and is 1 (one) or greater, and the second correction coefficient K2 is multiplied with each pixel value of the adjacent areas Ax2 and is less than 0 (zero). In this case, the first correction coefficient K1 and the second correction coefficient K2 are set so that a sum of a value obtained by multiplying the first correction coefficient K1 by the number of pixels in the focused area Ax1 and a value obtained by multiplying the second correction coefficient K2 by the number of pixels in the two adjacent areas Ax2 becomes zero.

The feature image generating portion 8c derives the first correction values respectively corresponding to the pixels of the focused area Ax1 by multiplying the first correction coefficient K1 by each pixel value of the focused area Ax1, and derives the second correction values respectively corresponding to the pixels of the two adjacent areas Ax2 by multiplying the second correction coefficient K2 by each pixel value of the two adjacent areas Ax2. Subsequently, the feature image generating portion 8c derives, as the conversion value for the pixel value of each focused pixel Px1, a value by integrating the first correction value and the second correction value.

Furthermore, the feature image generating portion 8c derives the conversion value by adding: a total value or an average value of a plurality of first correction values corresponding to a plurality of pixels of the focused area Ax1; and a total value or an average value of a plurality of second correction values corresponding to a plurality of pixels of the two adjacent areas Ax2.

An absolute value of the conversion value is an amplified absolute value of a difference between a pixel value of the focused area Ax1 and a pixel value of the two adjacent areas Ax2. The process to derive the conversion value by integrating the first correction value and the second correction value is an example of a process to emphasize the difference between the pixel value of the focused area Ax1 and the pixel value of two adjacent areas Ax2.

It is noted that the first correction coefficient K1 may be a negative number, and the second correction coefficient K2 may be a positive number.

For example, the feature image generating portion 8c may generate, as the first pre-process image g11, first main map data that includes a plurality of conversion values that are obtained by performing the main filter process using the main scanning direction D1 as the processing direction Dx1.

As shown in FIG. 6, when the test image g1 includes either or both of the vertical stripe Ps11 and the noise point Ps13, the main filter process in which the processing direction Dx1 is the main scanning direction D1 generates the first main map data by extracting either or both of the vertical stripe Ps11 and the noise point Ps13 from the test image g1.

In addition, when the test image g1 includes the horizontal stripe Ps12, the main filter process in which the processing direction Dx1 is the main scanning direction D1 generates the first main map data by removing the horizontal stripe Ps12 from the test image g1.

It is noted that the vertical stripe Ps11 corresponds to the first specific part, the horizontal stripe Ps12 corresponds to the second specific part, and the noise point Ps13 corresponds to the third specific part.

On the other hand, the second pre-process includes the main filter process in which the processing direction Dx1 is the sub scanning direction D2.

For example, the feature image generating portion 8c may generate, as the second pre-process image g12, second main map data that includes a plurality of conversion values that are obtained by performing the main filter process using the sub scanning direction D2 as the processing direction Dx1.

As shown in FIG. 6, when the test image g1 includes either or both of the horizontal stripe Ps12 and the noise point Ps13, the main filter process in which the processing direction Dx1 is the sub scanning direction D2 generates the second main map data by extracting either or both of the horizontal stripe Ps12 and the noise point Ps13 from the test image g1.

In addition, when the test image g1 includes the vertical stripe Ps11, the main filter process in which the processing direction Dx1 is the sub scanning direction D2 generates the second main map data by removing the vertical stripe Ps11 from the test image g1.

However, the main filter process may derive erroneous conversion values that are reverse in positivity and negativity in edge portions at opposite ends of the specific part Ps1 in the processing direction Dx1 with respect to the conversion values indicating the status of the original specific part Ps1. When such erroneous conversion values are processed as pixel values indicating the specific part Ps1, the determination of the image defect may be adversely affected.

In view of the above, in the present embodiment, the first pre-process further includes an edge emphasizing filter process in which the processing direction Dx1 is the main scanning direction D1, in addition to the main filter process in which the processing direction Dx1 is the main scanning direction D1.

Similarly, the second pre-process further includes the edge emphasizing filter process in which the processing direction Dx1 is the sub scanning direction D2, in addition to the main filter process in which the processing direction Dx1 is the sub scanning direction D2.

In the edge emphasizing filter process, an edge emphasizing is performed on the focused area Ax1 and a predetermined one of the two adjacent areas Ax2.

Specifically, in the edge emphasizing filter process, the pixel value of each of the focused pixels Px1 sequentially selected from the test image g1 is converted to an edge intensity that is obtained by integrating a third correction value and a fourth correction value, wherein the third correction value is obtained by correcting the pixel value of each pixel in the focused area Ax1 by a positive or negative third correction coefficient K3, and the fourth correction value is obtained by correcting the pixel value of each pixel in one of the two adjacent areas Ax2 by a fourth correction coefficient K4 that is reverse to the third correction coefficient K3 in positivity and negativity (see FIG. 6).

In the example shown in FIG. 6, the third correction coefficient K3 is a positive coefficient and the fourth correction coefficient K4 is a negative coefficient. The third correction coefficient K3 and the fourth correction coefficient K4 are set so that a sum of a value obtained by multiplying the third correction coefficient K3 by the number of pixels in the focused area Ax1 and a value obtained by multiplying the fourth correction coefficient K4 by the number of pixels in the one of the two adjacent areas Ax2 becomes zero.

The execution of the edge emphasizing filter process by using the main scanning direction D1 as the processing direction Dx1 generates horizontal edge strength map data in which the pixel value of each pixel in the test image g1 has been converted to the edge strength.

Similarly, the execution of the edge emphasizing filter process by using the sub scanning direction D2 as the processing direction Dx1 generates vertical edge strength map data in which the pixel value of each pixel in the test image g1 has been converted to the edge strength.

In the present embodiment, the feature image generating portion 8c generates the first main map data by executing the main filter process using the main scanning direction D1 as the processing direction Dx1.

Furthermore, the feature image generating portion 8c generates the horizontal edge strength map data by executing the edge emphasizing filter process using the main scanning direction D1 as the processing direction Dx1.

Furthermore, the feature image generating portion 8c generates the first pre-process image g11 by correcting each pixel value of the first main map data by each corresponding pixel value of the horizontal edge strength map data. For example, the feature image generating portion 8c generates the first pre-process image g11 by adding an absolute value of each pixel value of the horizontal edge strength map data to each pixel value of the first main map data.

Similarly, the feature image generating portion 8c generates the second main map data by executing the main filter process using the sub scanning direction D2 as the processing direction Dx1.

Furthermore, the feature image generating portion 8c generates the vertical edge strength map data by executing the edge emphasizing filter process using the sub scanning direction D2 as the processing direction Dx1.

Furthermore, the feature image generating portion 8c generates the second pre-process image g12 by correcting each pixel value of the second main map data by each corresponding pixel value of the vertical edge strength map data. For example, the feature image generating portion 8c generates the second pre-process image g12 by adding an absolute value of each pixel value of the vertical edge strength map data to each pixel value of the second main map data.

In the specific part extracting process, the three feature images g21, g22, and g23 are generated by extracting the vertical stripe Ps11, the horizontal stripe Ps12, and the noise point Ps13 individually from the first pre-process image g11 or the second pre-process image g12. The three feature images g21, g22, and g23 are the first feature image g21, the second feature image g22, and the third feature image g23.

The first feature image g21 includes, among specific parts Ps1 which are each composed of one or more significant pixels and are present in the first pre-process image g11 and the second pre-process image g12, a specific part Ps1 that is present in the first pre-process image g11 and is not common to the first pre-process image g11 and the second pre-process image g12. The first feature image g21 does not include the horizontal stripe Ps12 and the noise point Ps13. In addition, when the first pre-process image g11 includes the vertical stripe Ps11, the first feature image g21 includes the vertical stripe Ps11.

It is noted that the significant pixels are distinguished from the other pixels in the test image g1 when each pixel value of the test image g1, or an index value based on each pixel value, is compared with a predetermined threshold.

The second feature image g22 is formed by extracting, among the specific parts Ps1 that are present in the first pre-process image g11 and the second pre-process image g12, a specific part Ps1 that is present in the second pre-process image g12 and is not common to the first pre-process image g11 and the second pre-process image g12. The second feature image g22 does not include the vertical stripe Ps11 and the noise point Ps13. In addition, when the second pre-process image g12 includes the horizontal stripe Ps12, the second feature image g22 includes the horizontal stripe Ps12.

The third feature image g23 is formed by extracting a specific part Ps1 that is common to the first pre-process image g11 and the second pre-process image g12. The third feature image g23 does not include the vertical stripe Ps11 and the horizontal stripe Ps12. In addition, when the first pre-process image g11 and the second pre-process image g12 include the noise point Ps13, the third feature image g23 includes the noise point Ps13.

There may be various methods for generating three feature images g21, g22, and g23 from the first pre-process image g11 and the second pre-process image g12.

For example, the feature image generating portion 8c derives an index value Zi by applying a first pixel value Xi and a second pixel value Yi to the following formula (1), wherein the first pixel value Xi represents each pixel value that exceeds a predetermined reference value in the first pre-process image g11, and the second pixel value Yi represents each pixel value that exceeds the reference value in the second pre-process image g12. Here, the subscription "i" denotes the position identification number of each pixel.

[Math 1]

$$Zi = \frac{|Xi| - |Yi|}{|Xi| + |Yi|} \quad (1)$$

The index value Zi of each pixel constituting the vertical stripe Ps11 is a relatively large positive number. In addition, the index value Zi of each pixel constituting the horizontal stripe Ps12 is a relatively small negative number. In addition, the index value Zi of each pixel constituting the noise point Ps13 is 0 (zero) or a value close to 0 (zero). The index value Zi is an example of an index value of a difference between each pixel value of the first pre-process image g11 and each corresponding pixel value of the second pre-process image g12.

The above-mentioned nature of the index value Zi can be used to simplify the process of extracting the vertical stripe Ps11 from the first pre-process image g11, extracting the horizontal stripe Ps12 from the second pre-process image g12, and extracting the noise point Ps13 from the first pre-process image g11 or the second pre-process image g12.

For example, the feature image generating portion 8c generates the first feature image g21 by converting the first pixel value Xi in the first pre-process image g11 to a first specificity Pi that is derived by the following formula (2). This generates the first feature image g21 that includes the vertical stripe Ps11 extracted from the first pre-process image g11.

[Math 2]

$$Pi = XiZi \quad (2)$$

Furthermore, the feature image generating portion 8c generates the second feature image g22 by converting the second pixel value Yi in the second pre-process image g12 to a second specificity Qi that is derived by the following formula (3). This generates the second feature image g22 that includes the horizontal stripe Ps12 extracted from the second pre-process image g12.

[Math 3]

$$Qi = Yi(-Zi) \quad (3)$$

Furthermore, the feature image generating portion 8c generates the third feature image g23 by converting the first pixel value Xi in the first pre-process image g11 to a third specificity Ri that is derived by the following formula (4). This generates the third feature image g23 that includes the noise point Ps13 extracted from the first pre-process image g11.

[Math 4]

$$Ri = Xi(1 - Zi) \quad (4)$$

Alternatively, the feature image generating portion 8c may generate the third feature image g23 by converting the second pixel value Yi in the second pre-process image g12 to the third specificity Ri that is derived by the following formula (5). This generates the third feature image g23 that includes the noise point Ps13 extracted from the second pre-process image g12.

[Math 5]

$$Ri = Yi(Zi - 1) \quad (5)$$

As described above, the feature image generating portion 8c generates the first feature image g21 by converting each pixel value in the first pre-process image g11 by a predetermined formula (2) that is based on the index value Zi. The formula (2) is an example of a first conversion formula.

Furthermore, the feature image generating portion 8c generates the second feature image g22 by converting each pixel value in the second pre-process image g12 by a predetermined formula (3) that is based on the index value Zi. The formula (3) is an example of a second conversion formula.

Furthermore, the feature image generating portion 8c generates the third feature image g23 by converting each pixel value in the first pre-process image g11 or the second pre-process image g12 by a predetermined formula (4) or formula (5) that is based on the index value Zi. The formula (4) and the formula (5) are each an example of a third conversion formula.

The process of step S201 in which the first feature image g21, the second feature image g22, and the third feature image g23 are generated is an example of a process in which the vertical stripe Ps11, the horizontal stripe Ps12, and the noise point Ps13 of the one or more specific parts Ps1 are extracted as the image defects from the first pre-process image g11 and the second pre-process image g12.

The process of step S201 in which the third feature image g23 is generated is an example of a process to generate an extraction image by extracting, as the noise point Ps13, a specific part Ps1 among the one or more specific parts Ps1 that is common to the first pre-process image g11 and the second pre-process image g12 from the first pre-process image g11 and the second pre-process image g12. The third feature image g23 is an example of the extraction image.

After generating the feature images g21, g22, and g23, the feature image generating portion 8c moves the process to step S202.

<Step S202>

In step S202, the specific part identifying portion 8d identifies the positions of the specific parts Ps1 in the feature images g21, g22, and g23. The processes of steps S201 and S202 are an example of a process to identify the specific part Ps1 that is composed of a plurality of significant pixels in the test image g1.

For example, the specific part identifying portion 8d determines, as the specific part Ps1, a part that includes a pixel value that is out of a predetermined reference range in the feature images g21, g22, and g23. In step S202, the vertical stripe Ps11 is identified from the first feature image g21, the horizontal stripe Ps12 is identified from the second feature image g22, and the noise point Ps13 is identified from the third feature image g23.

In addition, the specific part identifying portion 8d executes a coupling process on each of the feature images g21, g22, and g23. In the coupling process, when a plurality of specific parts Ps1 are present in a predetermined proximity range in the main scanning direction D1 or the sub scanning direction D2, the specific parts Ps1 are coupled into one series of specific parts Ps1.

For example, when the first feature image g21 includes two vertical stripes Ps11 that are lined up in parallel at an interval in the sub scanning direction D2 in the proximity range, the specific part identifying portion 8d executes the coupling process to couple the two vertical stripes Ps11 into one vertical stripe Ps11.

Similarly, when the second feature image g22 includes two horizontal stripes Ps12 that are lined up in parallel at an interval in the main scanning direction D1 in the proximity range, the specific part identifying portion 8d executes the coupling process to couple the two horizontal stripes Ps12 into one horizontal stripe Ps12.

In addition, when the third feature image g23 includes a plurality of noise points Ps13 that are lined up in parallel at intervals in the main scanning direction D1 or in the sub scanning direction D2 in the proximity range, the specific part identifying portion 8d executes the coupling process to couple the plurality of noise points Ps13 into one noise point Ps13.

The specific part identifying portion 8d ends the specific defect determination process when, in the process of step S202, it has failed to identify a position of the specific part Ps1 in any of the three feature images g21, g22, and g23.

On the other hand, the specific part identifying portion 8d moves the process to step S203 when it has identified a position of the specific part Ps1 in one or more of the three feature images g21, g22, and g23.

<Step S203>

In step S203, the color vector identifying portion 8e identifies a detection color vector that represents a vector in a color space from one of a color of the specific part Ps1 in the test image g1 and a color of a reference area including the periphery of the specific part Ps1 to the other.

The reference area is an area of a predetermined range decided on the basis of the specific part Ps1. For example, the reference area includes a peripheral area adjacent to the specific part Ps1 and does not include the specific part Ps1. In addition, the reference area may include the specific part Ps1 and a peripheral area adjacent to the specific part Ps1.

The test image g1 is originally a uniform halftone image. As a result, when an excellent test image g1 is formed on the test output sheet 9, the specific part Ps1 is not identified, and the color vector at any position in the test image g1 is approximately zero vector.

On the other hand, when the specific part Ps1 is identified, the direction of the detection color vector between the specific part Ps1 and the reference area corresponding to the specific part Ps1 indicates an excess or a shortage of the toner density in any of the four developing colors in the image forming device 2.

Accordingly, the direction of the detection color vector indicates, as the cause of the specific part Ps1, any of the four image creating portions 4x in the image forming device 2.

It is noted that the color vector identifying portion 8e may identify, as the detection color vector, a vector in a color space from one of a color of the specific part Ps1 in the test image g1 and a predetermined reference color to the other. In this case, the reference color is the original color of the test image g1.

In step S203, the color vector identifying portion 8e, based on the detection color vector, further determines a developing color that is the cause of the specific part Ps1, and the excess/shortage state of the density of the developing color.

For example, the secondary storage device 82 preliminarily stores information of a plurality of unit vectors that indicate, for each of cyan, magenta, yellow, and black, the directions in which the density increases and decreases with respect to the reference color of the test image g1.

The color vector identifying portion 8e normalizes the detection color vector to a predetermined unit length. Furthermore, the color vector identifying portion 8e determines which of the plurality of unit vectors approximates most closely to the detection color vector after the normalization. This allows the color vector identifying portion 8e to determine a developing color that is the cause of the specific part Ps1 and the excess/shortage state of the density of the developing color.

After executing the process of step S203, the color vector identifying portion 8e moves the process to step S204.

<Step S204>

In step S204, the periodicity determining portion 8f moves the process to step S205 when the specific part Ps1 has been identified in either or both of the second feature image g22 and the third feature image g23. Otherwise, the periodicity determining portion 8f moves the process to step S207.

In the following description, either or both of the second feature image g22 and the third feature image g23 in which the specific part Ps1 has been identified is referred to as a periodicity determination image. The specific part Ps1 in the periodicity determination image is the horizontal stripe Ps12 or the noise point Ps13 (see FIG. 6).

<Step S205>

In step S205, the noise point determining portion 8h executes a sheet noise removal process on the third feature image g23.

The sheet may have a dot-like sheet noise that is formed in the manufacturing stage. Since the sheet noise is not an image defect, the sheet noise needs to be removed from a target of determination of the cause of the image defect.

In the sheet noise removal process, the sheet noise is detected from the noise points Ps13 in the third feature image g23, and the sheet noise is removed from the target of determination of the cause of the image defect.

Details of the sheet noise removal process are described below (see FIG. 5). After executing the sheet noise removal process, the noise point determining portion 8h moves the process to step S206.

It is noted that the noise point Ps13 that is the target of determination of the cause of the image defect in the following steps S206 to step S208, is the noise point Ps13 that has not been determined as a sheet noise.

<Step S206>

In step S206, the periodicity determining portion 8f executes a periodic specific part determination process on the periodicity determination image. The periodic specific part determination process includes a number determination process, a specific part periodicity determination process, and a specific part periodicity cause determination process.

The number determination process is a process to determine the number of specific parts Ps1 that are lined up in the sub scanning direction D2 in the periodicity determination image.

Specifically, the periodicity determining portion 8f determines the number of horizontal stripes Ps12 that are lined up in the sub scanning direction D2, by counting, in the second feature image g22, the number of horizontal stripes Ps12 lined up in the sub scanning direction D2 in which parts occupying the same range in the main scanning direction D1 exceed a predetermined ratio.

Furthermore, the periodicity determining portion 8f determines the number of noise points Ps13 lined up in the sub scanning direction D2 in the third feature image g23, by counting the number of noise points Ps13 of which positional shift in the main scanning direction D1 is within a predetermined range, among the noise points Ps13 that are lined up in the sub scanning direction D2.

The periodicity determining portion 8f executes the specific part periodicity determination process only on two or more specific parts Ps1 that are lined up in the sub scanning direction D2.

In addition, the periodicity determining portion 8f determines that one specific part Ps1 lined up in the sub scanning direction D2 does not have periodicity, and skips the specific part periodicity determination process and the specific part periodicity cause determination process for such specific part Ps1.

In the specific part periodicity determination process, it is determined whether or not the periodicity determination image has one or more predetermined periodicities in the sub scanning direction D2.

The periodicity corresponds to the outer peripheral length of the rotating body related to the image creation, such as the photoconductor 41, the charging roller 42a, the developing roller 43a, or the primary transfer rollers 441 that are provided in each of the image creating portions 4x or the transfer device 44. The state of the rotating bodies related to the image creation influences the quality of the image formed on the sheet. In the following description, the rotating bodies related to the image creation are referred to as image creation rotating bodies.

When the image defect occurs due to a defect of one of the image creation rotating bodies, the periodicity corresponding to the outer peripheral length of the image creation rotating body may appear as an interval in the sub scanning direction D2 between a plurality of horizontal stripes Ps12 or a plurality of noise points Ps13.

Accordingly, in a case where the periodicity determination image has the periodicity corresponding to the outer peripheral length of an image creation rotating body, it can be said that the image creation rotating body corresponding to the periodicity is the cause of the horizontal stripes Ps12 or the noise points Ps13 in the periodicity determination image.

When the number of specific parts Ps1 lined up in the sub scanning direction D2 in the periodicity determination image is 2 (two), the periodicity determining portion 8f executes an interval deriving process as the specific part periodicity determination process.

In the interval deriving process, the periodicity determining portion 8f derives an interval between two specific parts Ps1 in the sub scanning direction D2 as the period of the two specific parts Ps1.

When the number of specific parts Ps1 lined up in the sub scanning direction D2 in the periodicity determination image is 3 (three) or more, the periodicity determining portion 8f executes a frequency analyzing process as the specific part periodicity determination process.

In the frequency analyzing process, the periodicity determining portion 8f identifies a specific part frequency with respect to the periodicity determination image that includes three or more specific parts Ps1 lined up in the sub scanning direction D2. The specific part frequency is a dominant frequency in a frequency distribution of a data sequence of the specific part Ps1 in the periodicity determination image. The periodicity determining portion 8f identifies the specific part frequency by performing a frequency analysis such as the Fourier transformation.

Furthermore, the periodicity determining portion 8f derives, as the period of the three or more specific parts Ps1, a period corresponding to the specific part frequency.

In addition, in the specific part periodicity cause determination process, the periodicity determining portion 8f determines, for each of a plurality of predetermined candidates for image creation rotating body, whether or not the outer peripheral length of each candidate satisfies a predetermined period approximate condition with respect to the period of the specific part Ps1. The plurality of candidates for image creation rotating body in step S206 is an example of a plurality of predetermined cause candidates corresponding to the horizontal stripe Ps12 or the noise point Ps13.

In the following description, a specific part Ps1 corresponding to any one of the candidates for image creation rotating body that was determined to satisfy the period approximate condition is referred to as a periodic specific part, and the other specific parts Ps1 are referred to as non-periodic specific parts. The periodic specific part and the non-periodic specific parts are specific parts Ps1 included in the second feature image g22 or the third feature image g23.

In the specific part periodicity cause determination process, the periodicity determining portion 8f determines that one of the candidates for image creation rotating body that was determined to satisfy the period approximate condition is the cause of the periodic specific part. This determines the cause of the horizontal stripe Ps12 or the noise point Ps13.

In addition, in step S206, the periodicity determining portion 8f determines, based on the detection color vector determined in step S204, which of the image creation rotating bodies of the four image creating portions 4x of different developing colors is the cause of the horizontal stripe Ps12 or the noise point Ps13.

In addition, when three or more specific parts Ps1 lined up in the sub scanning direction D2 include a non-periodic specific part that does not correspond to the specific part frequency, the periodicity determining portion 8f selects the non-periodic specific part as a target of a feature pattern recognition process that is described below.

For example, the periodicity determining portion 8f generates inverse Fourier transformation data by applying an inverse Fourier transformation to the frequency distribution obtained by the Fourier transformation from which frequency components other than the specific part frequency have been removed.

Furthermore, the periodicity determining portion 8f identifies, as a non-periodic specific part, a specific part Ps1 that is, among three or more specific parts Ps1 lined up in the sub scanning direction D2, located at a position out of a peak position in the waveform in the sub scanning direction D2 indicated by the inverse Fourier transformation data.

In addition, upon determining, as a result of the process of step S206, that the second feature image g22 and the third feature image g23 do not include the non-periodic specific part, the periodicity determining portion 8f ends the specific defect determination process.

On the other hand, upon determining, as a result of the process of step S206, that the second feature image g22 and the third feature image g23 include the non-periodic specific part, the periodicity determining portion 8f moves the process to step S207.

<Step S207>

In step S207, the pattern recognizing portion 8g executes the feature pattern recognition process on the first feature image g21 and each of the second feature image g22 and the third feature image g23 that each include a non-periodic specific part.

In the feature pattern recognition process, the first feature image g21 and the second feature image g22 and the third feature image g23 that each include a non-periodic specific part that has not been subjected to the determination are treated as input images. In the feature pattern recognition process, the pattern recognizing portion 8g performs a pattern recognition on each input image to determine which of a plurality of predetermined cause candidates corresponding to the image defects corresponds to the input image.

In addition, the input image of the feature pattern recognition process may include the horizontal edge strength map data or the vertical edge strength map data obtained in the edge emphasizing filter process. For example, the first feature image g21 and the horizontal edge strength map data may be used as the input image in the feature pattern recognition process to determine the vertical stripe Ps11.

Similarly, the second feature image g22 and the vertical edge strength map data may be used as the input image in the feature pattern recognition process to determine the horizontal stripe Ps12.

Similarly, the third feature image g23 and either or both of the horizontal edge strength map data and the vertical edge strength map data may be used as the input image in the feature pattern recognition process to determine the noise point Ps13.

For example, in the feature pattern recognition process, the input image is classified into one of the plurality of cause candidates based on a learning model that has been preliminarily learned using, as teacher data, a plurality of sample images corresponding to the plurality of cause candidates.

For example, a classification-type machine learning algorithm called random forests, a machine learning algorithm called SVM (Support Vector Machine), or a CNN (Convolutional Neural Network) algorithm may be adopted in the learning model.

The learning model is prepared individually for each of the first feature image g21 and each of the second feature image g22 and the third feature image g23 that each include the non-periodic specific part. In addition, the plurality of sample images are used as the teacher data for each of the cause candidates.

In addition, in step S207, the pattern recognizing portion 8g determines, based on the detection color vector identified in step S204, which of the four image creating portions 4x having different developing colors has a part that is the cause of the vertical stripe Ps11, the horizontal stripe Ps12, or the noise point Ps13.

In step S207, the cause of the vertical stripe Ps11 and the causes of the horizontal stripe Ps12 and the noise point Ps13 that were identified as the non-periodic specific parts are determined. After executing the process of step S207, the pattern recognizing portion 8g ends the specific defect determination process.

It is noted that the process of step S207 is an example of a process to determine the cause of the vertical stripe Ps11, the horizontal stripe Ps12, or the noise point Ps13.

[Sheet Noise Removal Process]

Figure 5:
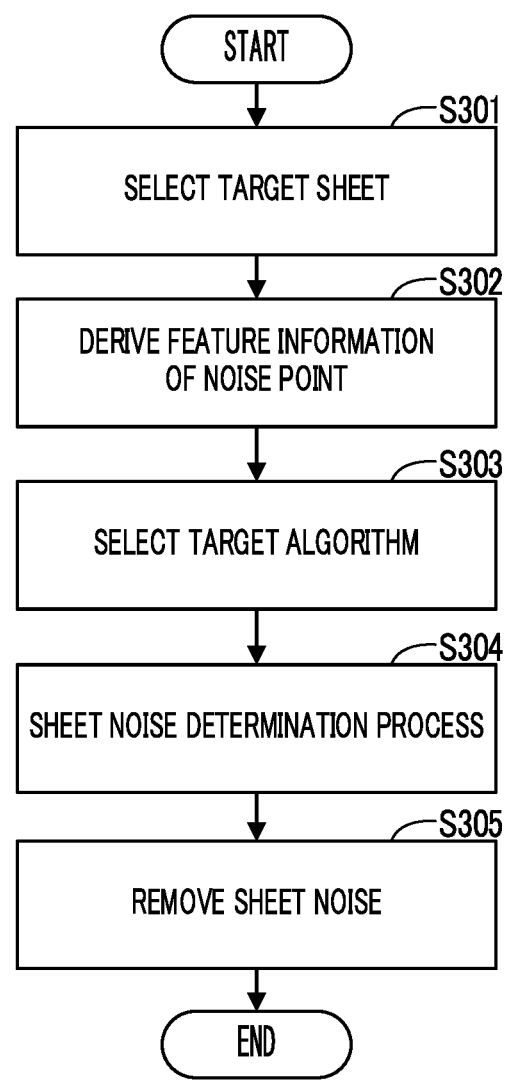
FIG. 5 is a flowchart showing an example of a procedure of a sheet noise removal process in the image processing apparatus according to the embodiment.

Next, the following describes an example of a procedure of the sheet noise removal process of step S205 with reference to the flowchart shown in FIG. 5. In the following description, S301, S302, . . . are identification signs representing a plurality of steps of the sheet noise removal process. The sheet noise removal process starts from step S301.

In the present embodiment, that the noise point Ps13 that is processed in the sheet noise removal process is the noise point Ps13 that has been identified as the non-periodic specific part.

<Step S301>

In step S301, the noise point determining portion 8h selects a target sheet from a plurality of predetermined sheet candidates in accordance with selection information that is input via the operation portion 801. The noise point determining portion 8h displays, on the display portion 802, a sheet selection screen that includes, as a selection menu, information of the plurality of sheet candidates, and executes a process to input the selection information.

The plurality of sheet candidates are candidates for a sheet type of the test output sheet 9. For example, the sheet type is determined in accordance with one or more of sheet material, product name or model, and manufacturing lot.

The feature of the sheet noise differs depending on the sheet type. As a result, in step S301, the noise point determining portion 8h selects the target sheet corresponding to the test output sheet 9 from the plurality of sheet candidates.

On the other hand, the image forming device 2 may include a plurality of sheet storage portions 21, and the secondary storage device 82 may preliminarily store storage sheet data that indicates types of the sheets stored in the plurality of sheet storage portions 21.

In the above-mentioned case, the storage sheet data may include data of the plurality of sheet candidates that correspond to the sheets stored in the plurality of sheet storage portions 21.

Furthermore, the noise point determining portion 8h may select, as the target sheet, one of the plurality of sheet candidates in the storage sheet data that corresponds to one of the plurality of sheet storage portions 21 from which the sheet is supplied in the test print process.

In the test print process, information for selecting the sheet storage portion 21 is transmitted among the plurality of processing modules of the CPU 80 via the RAM 81. In this case, the RAM 81 is an example of an input device that inputs information for selecting the target sheet.

After executing the process of step S301, the noise point determining portion 8h moves the process to step S302.

<Step S302>

In step S302, the noise point determining portion 8h derives feature information regarding the noise points Ps13 included in the third feature image g23. It is noted that the feature information is an example of information regarding the noise point Ps13 included in the test image g1. In the present embodiment, generation of the third feature image g23 by the specific part identifying portion 8d in step S201 is a part of a process to derive the feature information.

For example, the noise point determining portion 8h derives, as the feature information, at least one of the degree of flatness of the noise point Ps13 and a color vector difference of the noise point Ps13.

The noise point determining portion 8h derives, as the degree of flatness, a ratio of the length of the noise point Ps13 in the main scanning direction D1 to the length of the noise point Ps13 in the sub scanning direction D2, the roundness, or the flatness.

Figure 8A:
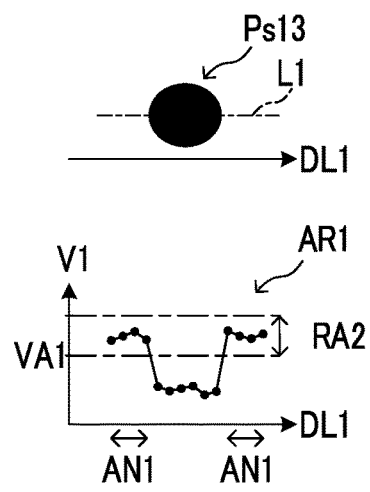
FIG. 8A to FIG. 8C each show an example of a noise point, a pixel value distribution of a transverse pixel sequence, and a differential value distribution of the transverse pixel sequence.
Figure 8B:
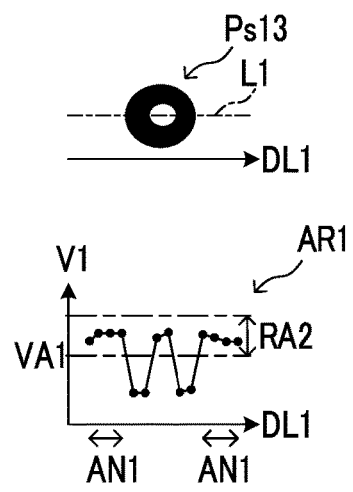
Figure 8C:
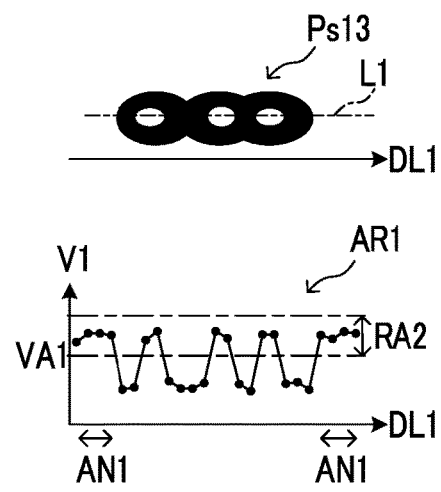
Figure 8C:
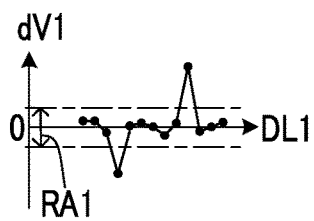
Figure 8C:
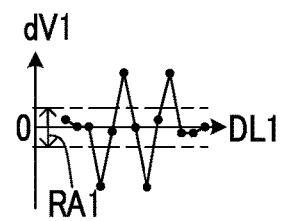
Figure 8C:
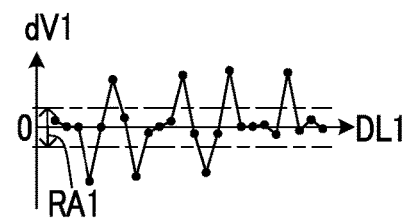

In addition, the noise point determining portion 8h may identify a longitudinal direction DL1 of the noise point Ps13 and derive, as the degree of flatness, a ratio of the length of the noise point Ps13 in the longitudinal direction DL1 to the length of the noise point Ps13 in a short direction that is perpendicular to the longitudinal direction DL1 (see FIG. 8A to FIG. 8C).

The color vector difference is an index value that indicates the degree of coincidence or difference of the detection color vector of the noise point Ps13 with respect to each of four predetermined reference color vectors. The four reference color vectors are predetermined vectors in the color space corresponding to the four developing colors used in the image forming device 2.

In the present embodiment, the four reference color vectors are unit vectors that respectively represent four colors of cyan, magenta, yellow, and black in the color space. The four reference color vectors are an example of one or more pieces of predetermined reference color information corresponding to one or more developing colors used in the image forming device 2.

In addition, as described above, the detection color vector of the noise point Ps13 is a vector in a color space from one of a color of the specific part Ps1 in the third feature image g23 and a color of the reference area to the other. In the present embodiment, the detection color vector is normalized to a predetermined unit length.

For example, the color vector difference may be an angle formed by the detection color vector and each of the reference color vectors. In this case, the closer to 0 degrees the color vector difference is, the mores to the developing color the color of the noise point Ps13 approximates. In addition, the closer to 180 degrees the color vector difference is, the more different from the developing color the color of the noise point Ps13 is.

The color vector difference is an example of information indicating the degree of coincidence or difference of the detection color vector with respect to each of the four reference color vectors.

It is noted that the detection color vector is an example of detection color information corresponding to the color of the noise point Ps13 in the third feature image g23.

The color of the sheet noise may be different from any of the developing colors of the image forming device 2. As a result, according to the color vector difference, the sheet noise is often distinguishable from the noise point Ps13 that is generated due to the image defect.

According to the color vector difference or the degree of flatness, the sheet noise is often distinguishable from the noise point Ps13 that is generated due to the image defect.

In the present embodiment, the noise point determining portion 8h derives, as the feature information, the edge strength and the number of edges of the noise point Ps13, in addition to the color vector difference and the degree of flatness. In the following description, a pixel sequence that traverses the noise point Ps13 in the third feature image g23 is referred to as a transverse pixel value sequence AR1 (see FIG. 8A to FIG. 8C).

The edge strength represents the degree of difference between the pixel value V1 of the noise point Ps13 and the pixel value V1 of an adjacent area AN1 adjacent to the noise point Ps13 in the third feature image g23 (see FIG. 8A to FIG. 8C). For example, the noise point determining portion 8h derives, as the edge strength, a difference between the representative value of the pixel values V1 of the noise point Ps13 and the representative value of the pixel values V1 of the adjacent area AN1.

In addition, the noise point determining portion 8h may derive, as the edge strength, the pixel value V1 of an outer edge part of the noise point Ps13 in an image that is obtained by executing a well-known edge emphasizing process on the third feature image g23. For example, the edge strength of the noise point Ps13 that is generated due to the image defect indicates a steeper edge than the edge strength of the sheet noise.

The number of edges is the number of positions in the transverse pixel sequence AR1 where the variation of the pixel value V1 exceeds an acceptable range, the transverse pixel sequence AR1 being a pixel sequence that traverses the noise point Ps13 in the third feature image g23 (see FIG. 8A to FIG. 8C).

Specifically, the noise point determining portion 8h sets a transverse line L1 that traverses the noise point Ps13 and identifies, as the transverse pixel sequence AR1, a pixel sequence along the transverse line L1 in the noise point Ps13 and two adjacent areas AN1 located at opposite sides of the noise point Ps13.

For example, the noise point determining portion 8h sets, as the transverse line L1, a line that passes through the center of the noise point Ps13 in the short direction and extends along the longitudinal direction DL1.

Furthermore, the noise point determining portion 8h derives, as the number of edges, the number of positions in the transverse pixel sequence AR1 where the variation of the pixel value V1 exceeds an acceptable range.

For example, the noise point determining portion 8h derives, as the number of edges, the number of positions in the transverse pixel sequence AR1 where a differential value dV1 of the pixel value V1 is out of a predetermined first reference range RA1 (see FIG. 8A to FIG. 8C).

In addition, the noise point determining portion 8h may derive, as the number of edges, the number of positions in the transverse pixel sequence AR1 where the pixel value V1 crosses a reference value VA1 or a second reference range RA2 (see FIG. 8A to FIG. 8C).

For example, the noise point determining portion 8h sets the reference value VA1 or the second reference range RA2 based on the pixel value V1 of the adjacent area AN1. It is noted that the pixel value V1 of the adjacent area AN1 is an example of the pixel value V1 of the transverse pixel sequence AR1.

FIG. 8A to FIG. 8C show examples of the noise point Ps13 generated due to the abnormal developing. The abnormal developing is a phenomenon in which dot-like defective toner images are developed on the surface of the photoconductor 41 by the developing device 43 of the image forming device 2 and are further transferred therefrom to the sheet. That is, the noise point Ps13 generated due to the abnormal developing is a type of image defect.

FIG. 8A shows a case where the symptom of the noise point Ps13 is mild. FIG. 8B shows a case where the symptom of the noise point Ps13 is middle. FIG. 8C shows a case where the symptom of the noise point Ps13 is serious.

As shown in FIG. 8A to FIG. 8C, when the cause of the noise point Ps13 is the abnormal developing, as the noise points Ps13 become more serious, the noise points Ps13 become annular images, and the annular images are linked together along a straight line. In general, the sheet noise does not have such a feature. Accordingly, the more the number of edges is, the higher is the possibility that the cause of the noise point Ps13 is the image defect, not the sheet noise.

After executing the process of step S302, the noise point determining portion 8h moves the process to step S303.

<Step S303>

In step S303, the noise point determining portion 8h selects a target algorithm corresponding to the target sheet, from a plurality of determination algorithms that respectively correspond to the plurality of sheet candidates.

The plurality of determination algorithms respectively corresponding to the plurality of sheet candidates are used to determine whether or not the noise point Ps13 is the sheet noise. In the present embodiment, the plurality of determination algorithms are used to determine whether or not the feature information of the noise point Ps13 derived in step S302 is information representing the sheet noise.

For example, the determination algorithms are used to determine whether or not the noise point Ps13 is the sheet noise by comparing a value of the feature information or an evaluation value of the feature information with a predetermined threshold.

In addition, the determination algorithms may be a learning model whose input parameter is the value of the feature information or the evaluation value of the feature information. The learning model has been preliminarily learned using, as teacher data, a plurality of pieces of sample data corresponding to sheet noises. The sample data corresponds to the feature information.

The learning model is prepared individually for each of the plurality of sheet candidates. For example, the random forests, the SVM, or the CNN algorithm may be adopted in the learning model.

In the present embodiment, the secondary storage device 82 preliminarily stores algorithm data DT1 that indicates the plurality of sheet candidates and the plurality of determination algorithms respectively corresponding thereto.

In step S301, the noise point determining portion 8h generates the selection menu of the sheet selection screen based on the algorithm data DT1. Furthermore, in step S303, the noise point determining portion 8h selects, as the target algorithm, one of the plurality of determination algorithms that corresponds to the target sheet.

After executing the process of step S303, the noise point determining portion 8h moves the process to step S304.

<Step S304>

In step S304, the noise point determining portion 8h executes a sheet noise determination process. In the sheet noise determination process, it is determined whether or not the noise point Ps13 is the sheet noise by applying the feature information derived in step S302 to the target algorithm.

After executing the process of step S304, the noise point determining portion 8h moves the process to step S305.

<Step S305>

In step S305, the noise point determining portion 8h removes the noise point Ps13 that was determined as the sheet noise, from the target of determination of the cause of the image defect performed in step S207.

That is, the process of step S207 of determining the cause of the noise point Ps13 is executed on the noise point Ps13 that was not determined as the sheet noise in the third feature image g23.

After executing the process of step S305, the noise point determining portion 8h ends the sheet noise removal process.

As described above, the noise point determining portion 8h executes the sheet noise determination process of step S304 by applying the feature information to the target algorithm that corresponds to the type of the sheet of the test output sheet 9 itself. This makes it possible to determine with high accuracy whether or not the noise point Ps13 in the third feature image g23 is the sheet noise.

In addition, in step S302, the noise point determining portion 8h derives, as the feature information, at least one of the degree of flatness of the noise point Ps13 and the edge strength of the noise point Ps13 in the third feature image g23.

In the present embodiment, the noise point determining portion 8h identifies, as the feature information, the number of edges and the color vector difference, too. The degree of flatness, the edge strength, the number of edges, and the color vector difference are effective information for distinguishing the sheet noise from the image defect.

First Application Example

The following describes a first application example of the image processing apparatus 10.

In the present application example, in step S302, the noise point determining portion 8h derives, as the feature information, an image of a target area including the noise point Ps13 in the third feature image g23. For example, the target area is of predetermined shape and size centered around the noise point Ps13.

In addition, the determination algorithms of the present application example represent a sheet noise pattern recognition process in which the image of the target area is treated as an input image, and it is determined whether or not the input image is an image corresponding to the sheet noise by performing a pattern recognition on the input image.

In the sheet noise determination process of step S304, the noise point determining portion 8h determines whether or not the noise point Ps13 is the sheet noise by executing the sheet noise pattern recognition process using the image of the target area as the input image.

In the sheet noise pattern recognition process of the present application example, it is determined whether or not an input image corresponds to the sheet noise based on a learning model that has been preliminarily learned using, as teacher data, a plurality of sample images corresponding to sheet noises.

For example, the random forests, the SVM, or the CNN algorithm may be adopted in the learning model.

With the adoption of the present application example, a similar effect is obtained as in the case where the above-described embodiment is adopted.

Second Application Example

Figure 9:
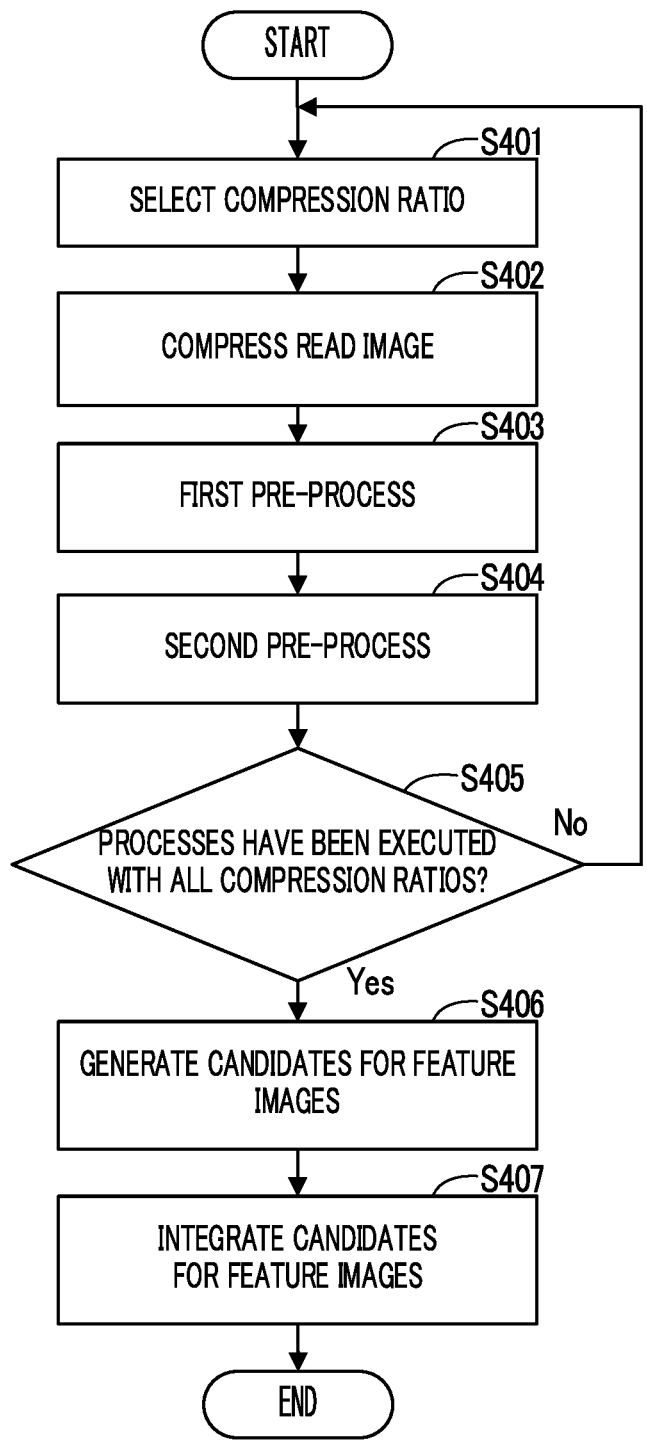
FIG. 9 is a flowchart showing an example of a procedure of a feature image generating process in a first application example of the image processing apparatus according to the embodiment.

Next, the following describes an example of a procedure of a feature image generating process according to a second application example of the image processing apparatus 10 with reference to the flowchart shown in FIG. 9.

In the following description, S401, S402, . . . are identification signs representing a plurality of steps of the feature image generating process of the present application example. The feature image generating process of the present application example starts from step S401.

<Step S401>

In step S401, the feature image generating portion 8c selects, from a plurality of predetermined compression ratio candidates, a compression ratio to be adopted and moves the process to step S402.

<Step S402>

In step S402, the feature image generating portion 8c generates the test image g1 by compressing the read image with the selected compression ratio. The processes of steps S401 and S402 are an example of a compression process. Thereafter, the feature image generating portion 8c moves the process to step S403.

<Step S403>

In step S403, the feature image generating portion 8c generates the first pre-process image g11 by executing the first pre-process on the compressed test image g1 obtained in step S402. Thereafter, the feature image generating portion 8c moves the process to step S404.

<Step S404>

In step S404, the feature image generating portion 8c generates the second pre-process image g12 by executing the second pre-process on the compressed test image g1 obtained in step S402. Thereafter, the feature image generating portion 8c moves the process to step S405.

<Step S405>

In step S405, upon determining that the processes of steps S401 to S404 have been executed with all of the plurality of compression ratio candidates, the feature image generating portion 8c moves the process to step S406. Otherwise, the feature image generating portion 8c executes the processes of steps S401 to S404 with a different compression ratio.

In the compression process of steps S401 and S402, the feature image generating portion 8c generates a plurality of test images g1 of different sizes by compressing the read image with a plurality of different compression ratios.

Furthermore, in steps S403 and S404, the feature image generating portion 8c generates a plurality of first pre-process images g11 and a plurality of second pre-process images g12 that respectively correspond to the plurality of test images g1 by executing the first pre-process and the second pre-process on the plurality of test images g1.

<Step S406>

In step S406, the feature image generating portion 8c executes the specific part extracting process on each of the plurality of first pre-process images g11 and the plurality of second pre-process images g12. This allows the feature image generating portion 8c to generate a plurality of candidates for each of the first feature image g21, the second feature image g22, and the third feature image g23 corresponding to the plurality of test images g1. Thereafter, the feature image generating portion 8c moves the process to step S407.

<Step S407>

In step S407, the feature image generating portion 8c generates the first feature image g21, the second feature image g22, and the third feature image g23 by integrating the plurality of candidates obtained in step S406. Thereafter, the feature image generating portion 8c ends the feature image generating process.

For example, the feature image generating portion 8c sets, as each pixel value of the first feature image g21, a representative value such as the maximum value or the average value of the pixel values of the plurality of candidates for the first feature image g21. This also applies to the second feature image g22 and the third feature image g23.

The processes of steps S401 to S404 are an example of a process to generate a plurality of first pre-process images g11 and a plurality of second pre-process images g12 by executing the first pre-process and the second pre-process multiple times with different size ratios of the size of the test image g1 to that of the focused area Ax1 and the adjacent areas Ax2. Changing the compression ratio is an example of changing the size ratio between the size of the test image g1 and the size of the focused area Ax1 and the adjacent areas Ax2.

In addition, the processes of steps S406 to S407 are an example of a process to generate the first feature image g21, the second feature image g22, and the third feature image g23 by performing the specific part extracting process based on the plurality of first pre-process images g11 and the plurality of second pre-process images g12.

With the adoption of the present application example, it is possible to extract, without omission, the vertical stripes Ps11 or the horizontal stripes Ps12 of different thicknesses, or the noise points Ps13 of different sizes.

The first pre-process and the second pre-process of the present application example are an example of a process to generate a plurality of first pre-process images g11 and a plurality of second pre-process images g12 by executing the first pre-process and the second pre-process multiple times with different size ratios of the size of the test image g1 to that of the focused area Ax1 and the adjacent areas Ax2.

It is noted that the feature image generating portion 8c may generate a plurality of first pre-process images g11 and a plurality of second pre-process images g12 by executing the first pre-process and the second pre-process multiple times by changing the filter size.

The filter size is the size of the focused area Ax1 and the adjacent areas Ax2 in the first pre-process and the second pre-process. Changing the filter size is an example of changing the size ratio between the size of the test image g1 and the size of the focused area Ax1 and the adjacent areas Ax2.

In the present application example, the feature image generating portion 8c may integrates the plurality of first pre-process images g11 into one and integrates the plurality of second pre-process images g12 into one.

For example, the feature image generating portion 8c sets, as each pixel value of the integrated first feature image g21, a representative value such as the maximum value or the average value of the pixel values of the plurality of first pre-process images g11. This also applies to the plurality of second pre-process images g12.

Furthermore, the feature image generating portion 8c may execute the specific part extracting process on the integrated first pre-process image g11 and the integrated second pre-process image g12. This generates the first feature image g21, the second feature image g22, and the third feature image g23.

Third Application Example

Next, the following describes the feature image generating process according to a third application example of the image processing apparatus 10.

In the present application example, the feature image generating portion 8c identifies, as the specific part Ps1, a part in which the pixel values of the first pre-process image g11 and the second pre-process image g12 are out of a predetermined reference range.

That is, in the present application example, the feature image generating portion 8c performs the specific part extracting process to identify the specific part Ps1 based on the size of each pixel value of the first pre-process image g11 and the second pre-process image g12. The process of the present application example performed by the feature image generating portion 8c is an example of a process to identify the specific part Ps1 composed of one or more significant pixels in the test image g1.

Furthermore, the feature image generating portion 8c extracts the vertical stripe Ps11 by removing, from the specific part Ps1 of the first pre-process image g11, the specific part Ps1 that is common to the first pre-process image g11 and the second pre-process image g12.

Furthermore, the feature image generating portion 8c extracts the horizontal stripe Ps12 by removing, from the specific part Ps1 of the second pre-process image g12, the specific part Ps1 that is common to the first pre-process image g11 and the second pre-process image g12.

Furthermore, the feature image generating portion 8c extracts, as the noise point Ps13, the specific part Ps1 that is common to the first pre-process image g11 and the second pre-process image g12.

For example, the feature image generating portion 8c generates the first feature image g21 by converting the first pixel value Xi that was not determined as the vertical stripe Ps11 in the first pre-process image g11, into an interpolation value based on the surrounding pixel values.

Similarly, the feature image generating portion 8c generates the second feature image g22 by converting the second pixel value Yi that was not determined as the horizontal stripe Ps12 in the second pre-process image g12, into an interpolation value based on the surrounding pixel values.

Similarly, the feature image generating portion 8c generates the third feature image g23 by converting the first pixel value Xi that was not determined as the noise point Ps13 in the first pre-process image g11, into an interpolation value based on the surrounding pixel values.

Alternatively, the feature image generating portion 8c may generate the third feature image g23 by converting the second pixel value Yi that was not determined as the noise point Ps13 in the second pre-process image g12, into an interpolation value based on the surrounding pixel values.

Fourth Application Example

The following describes the image defect determination process according to a fourth application example of the image processing apparatus 10.

In general, it may be difficult, depending on the density state of each color, for the image sensor 1a to correctly detect a gradation level of a yellow part in an image that is a mixture of yellow and other colors. Similarly, it may be difficult, depending on the density state of each color, for the image sensor 1a to correctly detect a gradation level of a chromatic color part in an image that is a mixture of black and chromatic colors.

In the present application example, the job control portion 8b performs the test print process to output two or three test output sheets 9 with different types of original test images g01 formed thereon.

In a case where three test output sheets 9 are output, a sheet on which an original mixed-color test image has been formed, a sheet on which an original yellow test image has been formed, and a sheet on which an original gray test image has been formed are output, wherein the original mixed-color test image is a combination of a uniform cyan single-color halftone image and a uniform magenta single-color halftone image, the original yellow test image is a uniform yellow single-color halftone image, and the original gray test image is a uniform black single-color halftone image.

In a case where two test output sheets 9 are output, a sheet on which a mixed-color test image has been formed and a sheet on which the original gray test image has been formed are output, wherein the mixed-color test image is a combination of a uniform cyan single-color halftone image, a uniform magenta single-color halftone image, and a uniform yellow single-color halftone image.

Accordingly, the test image g1 of the present application example includes the mixed-color test image, the yellow test image, and the gray test image that respectively correspond to the original mixed-color test image, the original yellow test image, and the original gray test image.

The yellow test image and the gray test image are each a halftone image of one developing color that is different from the colors mixed in the mixed-color test image. The yellow test image and the gray test image are each an example of a single-color test image.

In the present application example, the feature image generating portion 8c generates the first feature image g21, the second feature image g22, and the third feature image g23 for each of the mixed-color test images and the single-color test images read from a plurality of test output sheets 9.

Furthermore, in the present application example, the specific part identifying portion 8d identifies the positions of the specific parts Ps1 in the first feature image g21, the second feature image g22, and the third feature image g23 that respectively correspond to the mixed-color test images and the single-color test images. It is noted that the mixed-color test image and the single-color test image of the present application example are each an example of a target test image that is a target of identifying the specific part Ps1.

In the present application example, as is the case with the above-described embodiment, the color vector identifying portion 8e, the periodicity determining portion 8f, and the pattern recognizing portion 8g execute a process to determine the causes of the image defects, by using the first feature image g21, the second feature image g22, and the third feature image g23 corresponding to the mixed-color test images.

In the present application example, the periodicity determining portion 8f and the pattern recognizing portion 8g determine the cause of an image defect corresponding to the specific part Ps1 in the mixed-color test image, from among a plurality of image creating portions 4x corresponding to a plurality of developing colors mixed in the mixed-color test image.

Furthermore, in the present application example, as is the case with the above-described embodiment, the periodicity determining portion 8f and the pattern recognizing portion 8g execute a process to determine the causes of the image defects, by using the first feature image g21, the second feature image g22, and the third feature image g23 corresponding to the single-color test images.

In the present application example, the periodicity determining portion 8f and the pattern recognizing portion 8g determine the cause of an image defect corresponding to the specific part in the single-color test image, from one of the plurality of image creating portions 4x that corresponds to the color of the single-color test image.

When the present application example is adopted, it is possible to determine the cause of the image defect based on the test output sheets 9 whose number is smaller than the total number of the developing colors used in the image forming device 2.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image processing method comprising:
  a processor selecting a target sheet from a plurality of predetermined sheet candidates in accordance with selection information that is input via an input device;

the processor deriving feature information regarding a noise point from a target image that is obtained through an image reading process performed on an output sheet output from an image forming device, the noise point being a dot-like noise image included in the target image; and the processor executing a sheet noise determination process to determine whether or not the noise point is a dot-like sheet noise by applying the feature information to a determination algorithm that corresponds to the target sheet, the sheet noise being included in a sheet of the output sheet itself, the determination algorithm being one of a plurality of determination algorithms that respectively correspond to the plurality of sheet candidates, wherein the processor deriving the feature information includes identifying, as the feature information, a degree of coincidence or difference of a piece of detection color information that corresponds to a color of the noise point in the target image, with respect to one or more pieces of predetermined reference color information corresponding to one or more developing colors used in the image forming device the one or more pieces of reference color information are one or more reference color vectors that correspond to the one or more developing colors in a color space, the piece of detection color information is a detection color vector that represents a vector in the color space from one of a color of the noise point in the target image and a color of a reference area including a periphery of the noise point to the other, and the processor identifies, as the feature information, a degree of coincidence or difference of the detection color vector with respect to the reference color vectors.

2. An image processing method comprising:

a processor selecting a target sheet from a plurality of predetermined sheet candidates in accordance with selection information that is input via an input device;

the processor deriving feature information regarding a noise point from a target image that is obtained through an image reading process performed on an output sheet output from an image forming device, the noise point being a dot-like noise image included in the target image; and the processor executing a sheet noise determination process to determine whether or not the noise point is a dot-like sheet noise by applying the feature information to a determination algorithm that corresponds to the target sheet, the sheet noise being included in a sheet of the output sheet itself, the determination algorithm being one of a plurality of determination algorithms that respectively correspond to the plurality of sheet candidates, wherein the processor deriving the feature information includes:
generating an extraction image by extracting the noise point from the target image; and
deriving, as the feature information, a degree of flatness of the noise point in the extraction image.

3. The image processing method according to claim 1, wherein the processor deriving the feature information includes:
generating an extraction image by extracting the noise point from the target image; and
deriving, as the feature information, an edge strength of the noise point in the extraction image.

4. The image processing method according to claim 1, wherein the processor deriving the feature information includes:
generating an extraction image by extracting the noise point from the target image; and
deriving, as the feature information, a number of edges that is a number of positions in a transverse pixel sequence where variation of a pixel value exceeds an acceptable range, the transverse pixel sequence being a pixel sequence traversing the noise point in the extraction image.

5. The image processing method according to claim 1, wherein the processor executing the sheet noise determination process includes
determining whether or not the noise point is the sheet noise by comparing a value of the feature information or an evaluation value of the feature information with a predetermined threshold.

6. The image processing method according to claim 1, wherein the processor executing the sheet noise determination process includes
determining whether or not the noise point is the sheet noise by applying a value of the feature information or an evaluation value of the feature information as an input parameter of a learning model that has been preliminarily learned using, as teacher data, a plurality of pieces of sample data corresponding to sheet noises.

7. The image processing method according to claim 1, wherein the processor deriving the feature information includes:
generating an extraction image by extracting the noise point from the target image; and
deriving, as the feature information, an image of a target area including the noise point in the extraction image, and the processor executing the sheet noise determination process includes
executing a sheet noise pattern recognition process in which the image of the target area is treated as an input image, and it is determined whether or not the input image is an image corresponding to the sheet noise by performing a pattern recognition on the input image.

8. An image processing method comprising:

a processor selecting a target sheet from a plurality of predetermined sheet candidates in accordance with selection information that is input via an input device;

the processor deriving feature information regarding a noise point from a target image that is obtained through an image reading process performed on an output sheet output from an image forming device, the noise point being a dot-like noise image included in the target image; and the processor executing a sheet noise determination process to determine whether or not the noise point is a dot-like sheet noise by applying the feature information to a determination algorithm that corresponds to the target sheet, the sheet noise being included in a sheet of the output sheet itself, the determination algorithm being one of a plurality of determination algorithms that respectively correspond to the plurality of sheet candidates, wherein the processor deriving the feature information includes:
generating an extraction image by extracting the noise point from the target image; and deriving, as the feature information, an image of a target area including the noise point in the extraction image, the processor executing the sheet noise determination process includes executing a sheet noise pattern recognition process in which the image of the target area is treated as an input image, and it is determined whether or not the input image is an image corresponding to the sheet noise by performing a pattern recognition on the input image, and in the sheet noise pattern recognition process, it is determined whether or not the input image is the image corresponding to the sheet noise based on a learning model that has been preliminarily learned using, as teacher data, a plurality of sample images corresponding to sheet noises.

9. The image processing method according to claim 2, wherein the processor generating the extraction image includes:

generating a first pre-process image by executing a first pre-process using a horizontal direction of the test image as a predetermined processing direction, the first pre-process including a main filter process in which a pixel value of each of focused pixels sequentially selected from the test image is converted to a conversion value that is obtained by performing a process to emphasize a difference between a pixel value of a focused area including the focused pixels and a pixel value of two adjacent areas that are adjacent to the focused area from opposite sides in the processing direction;

generating a second pre-process image by executing a second pre-process that includes the main filter process in which a vertical direction of the test image is used as the processing direction; and generating, as the extraction image, an image by extracting, as the noise point, a specific part that is common to the first pre-process image and the second pre-process image, from specific parts which are each composed of one or more significant pixels and are present in the first pre-process image and the second pre-process image.

10. The image processing method according to claim 9, wherein the first pre-process includes:

generating first main map data by executing the main filter process using the horizontal direction as the processing direction;

generating horizontal edge strength map data by executing an edge emphasizing filter process on the focused area and one of the two adjacent areas on the test image, using the horizontal direction as the processing direction; and generating the first pre-process image by correcting each pixel value of the first main map data by each corresponding pixel value of the horizontal edge strength map data, and the second pre-process includes:

generating second main map data by executing the main filter process using the vertical direction as the processing direction;

generating vertical edge strength map data by executing the edge emphasizing filter process on the focused area and one of the two adjacent areas on the test image, using the vertical direction as the processing direction; and generating the second pre-process image by correcting each pixel value of the second main map data by each corresponding pixel value of the vertical edge strength map data.

11. An image processing apparatus comprising the processor that executes processes of the image processing method according to claim 1.

* * * * *